(12) United States Patent
Cheng et al.

(10) Patent No.: US 11,076,295 B2
(45) Date of Patent: Jul. 27, 2021

(54) REMOTE MANAGEMENT METHOD, AND DEVICE

(71) Applicant: Huawei Technologies Co., Ltd., Shenzhen (CN)

(72) Inventors: Ziyao Cheng, Shenzhen (CN); Shuiping Long, Beijing (CN); Qiang Yi, Beijing (CN); Linyi Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 16/092,990

(22) PCT Filed: Apr. 12, 2016

(86) PCT No.: PCT/CN2016/079097
§ 371 (c)(1),
(2) Date: Oct. 11, 2018

(87) PCT Pub. No.: WO2017/177383
PCT Pub. Date: Oct. 19, 2017

(65) Prior Publication Data
US 2019/0140837 A1    May 9, 2019

(51) Int. Cl.
*H04L 9/32* (2006.01)
*H04W 12/30* (2021.01)
(Continued)

(52) U.S. Cl.
CPC .......... *H04W 12/35* (2021.01); *H04L 9/3247* (2013.01); *H04L 9/3268* (2013.01); *H04W 8/20* (2013.01);
(Continued)

(58) Field of Classification Search
CPC ......... H04W 12/0023; H04W 12/0609; H04W 12/1008; H04W 8/20; G06F 21/44;
(Continued)

(56) References Cited

U.S. PATENT DOCUMENTS

| 2002/0040936 | A1* | 4/2002 | Wentker | G06Q 20/3576 235/492 |
|---|---|---|---|---|
| 2012/0190354 | A1* | 7/2012 | Merrien | H04L 63/083 455/422.1 |

(Continued)

FOREIGN PATENT DOCUMENTS

| CN | 101296136 A | 10/2008 |
|---|---|---|
| CN | 104469737 A | 3/2015 |

(Continued)

OTHER PUBLICATIONS

FIPS Pub 186-4 Digital Signature Standard (DSS) National Institute of Standards and Technology Jul. 2013 (Year: 2013).*

(Continued)

*Primary Examiner* — David J Pearson
(74) *Attorney, Agent, or Firm* — Conley Rose, P.C.

(57) ABSTRACT

A remote management method and a device, where the method includes receiving, by a subscription manager-data preparation (SM-DP+) server, a first identifier from a local profile assistant (LPA), searching for, by the SM-DP+ server, a remote profile management command corresponding to the first identifier, generating, by the SM-DP+ server, a first digital signature according to the first identifier and the remote profile management command, and sending the first digital signature and the remote profile management command to an embedded universal integrated circuit card (eUICC) using the LPA.

21 Claims, 12 Drawing Sheets

(51) Int. Cl.
 *H04W 8/20*    (2009.01)
 *H04W 12/40*   (2021.01)
 *H04W 12/069*  (2021.01)
 *H04W 12/106*  (2021.01)
 *H04W 12/71*   (2021.01)

(52) U.S. Cl.
 CPC ....... *H04W 12/069* (2021.01); *H04W 12/106* (2021.01); *H04W 12/40* (2021.01); *H04W 12/71* (2021.01)

(58) Field of Classification Search
 CPC ......... G06F 21/445; G06F 21/64; H04L 9/32; H04L 9/321; H04L 9/006; H04L 9/3247; H04L 9/3265; H04L 63/0823; H04L 9/3268
 See application file for complete search history.

(56) References Cited

U.S. PATENT DOCUMENTS

| | | | |
|---|---|---|---|
| 2012/0331292 A1* | 12/2012 | Haggerty | H04L 63/0853 713/168 |
| 2013/0227646 A1* | 8/2013 | Haggerty | H04L 63/06 726/3 |
| 2014/0219447 A1 | 8/2014 | Park et al. | |
| 2014/0237101 A1* | 8/2014 | Park | H04W 8/183 709/223 |
| 2015/0163056 A1* | 6/2015 | Nix | H04W 12/0023 380/46 |
| 2015/0282060 A1* | 10/2015 | Huang-Fu | H04W 8/205 455/435.2 |
| 2016/0283216 A1 | 9/2016 | Gao et al. | |
| 2016/0352698 A1 | 12/2016 | Long | |
| 2017/0280320 A1* | 9/2017 | Caceres | H04W 8/24 |
| 2018/0027410 A1* | 1/2018 | Berard | H04W 76/10 380/270 |
| 2018/0041601 A1* | 2/2018 | Park | G06K 9/18 |
| 2018/0070224 A1* | 3/2018 | Park | H04L 63/102 |

FOREIGN PATENT DOCUMENTS

| | | |
|---|---|---|
| CN | 104703170 A | 6/2015 |
| CN | 104852911 A | 8/2015 |
| WO | 2014030893 A1 | 2/2014 |
| WO | 2015081545 A1 | 6/2015 |

OTHER PUBLICATIONS

Machine Translation and Abstract of Chinese Publication No. CN101296136, Oct. 29, 2008, 11 pages.
Machine Translation and Abstract of Chinese Publication No. CN104469737, Mar. 25, 2015, 12 pages.
Machine Translation and Abstract of Chinese Publication No. CN104852911, Aug. 19, 2015, 38 pages.
Machine Translation and Abstract of International Publication No. WO2014030893, Feb. 27, 2014, 39 pages.
GSMA "RSP Architecture Version 1.0," Official Document SGP.21, Dec. 23, 2015, 52 pages.
GSMA "RSP Technical Specification Version 1.0," Official Document, SGP.22, Jan. 13, 2016, 114 pages.
Foreign Communication From a Counterpart Application, European Application No. 16898202.3, Extended European Search Report dated Jan. 23, 2019, 7 pages.
Foreign Communication From a Counterpart Application, PCT Application No. PCT/CN2016/079097, English Translation of International Search Report dated Dec. 28, 2016, 2 pages.
Foreign Communication From a Counterpart Application, PCT Application No. PCT/CN2016/079097, English Translation of Written Opinion dated Dec. 28, 2016, 4 pages.
GSM Association, "RSP Technical Specification, Version 1.0," Jan. 13, 2016, XP040675430, 114 pages.

* cited by examiner

REMOTE MANAGEMENT METHOD, AND DEVICE

CROSS-REFERENCE TO RELATED APPLICATIONS

This application is a U.S. National Stage of International Patent Application No. PCT/CN2016/079097 filed on Apr. 12, 2016, which is hereby incorporated by reference in its entirety.

TECHNICAL FIELD

Embodiments of the present invention relate to the field of communications technologies, and specifically, to a remote management method and a device.

BACKGROUND

An embedded universal integrated circuit card (embedded Universal Integrated Circuit Card, eUICC) may also be referred to as an embedded subscriber identity module (embedded Subscriber Identity Module, eSIM) card. The eUICC may be placed into a user terminal (such as a mobile phone or a tablet computer) through insertion/removal or welding.

In an actual application, after a profile (profile) provided by a communications operator is installed in the eUICC, the eUICC can access a communications operator network (such as a 2G/3G/4G network). Generally, the communications operator performs remote management on the profile in the eUICC, for example, activates the profile in the eUICC, deactivates the profile in the eUICC, deletes the profile in the eUICC, or audits a status of the eUICC.

FIG. 1A and FIG. 1B are schematic flowcharts of existing remote management. As shown in FIG. 1A and FIG. 1B, a procedure in which the communications operator performs remote management on the profile in the eUICC may generally include the following steps.

101. When the communications operator needs to perform remote management on the profile in the eUICC, the communications operator sends, to a subscription manager-data preparation (Subscription Manager-Data Preparation, SM-DP+) server, at least a remote profile management command (Remote profile Management Command) that is used to perform remote management on the profile, an eUICC identifier (eUICC-ID, EID), and an address that is of a subscription manager-discovery service (Subscription Manager-Discovery Service, SM-DS) server and that is corresponding to the profile.

102. After receiving the remote profile management command and the address of the SM-DS server, the SM-DP+ server generates an event identifier corresponding to the remote profile management command (the event identifier is used to identify a remote profile management event, and the event identifier may also be referred to as a notification identifier or a notification identifier), and establishes and stores at least a correspondence between the event identifier and the remote profile management command, the eUICC identifier, an address of the SM-DP+ server, and the address of the SM-DS server.

103. The SM-DP+ server establishes a connection to the SM-DS server according to the address of the SM-DS server.

104. After establishing the connection to the SM-DS server, the SM-DP+ server registers at least the event identifier, the address of the SM-DP+ server, and the eUICC identifier in the SM-DS server.

105. A local profile assistant (Local Profile Assistant, LPA) in the user terminal establishes a connection to the SM-DS server by using the address that is of the SM-DS server and that is provided by the eUICC.

106. After the LPA establishes the connection to the SM-DS server, the SM-DS server sends at least the event identifier, the eUICC identifier, and the address of the SM-DP+ server to the LPA.

107. The LPA establishes a connection to the SM-DP+ server according to the address of the SM-DP+ server.

108. After the LPA establishes the connection to the SM-DP+ server, the LPA sends at least the event identifier to the SM-DP+ server.

109. After the SM-DP+ server receives the event identifier, the SM-DP+ server sends, to the eUICC directly by using the LPA, the stored remote profile management command corresponding to the event identifier.

110. After receiving the remote management command, the eUICC executes the remote profile management command.

However, it is found from practice that in a process in which the SM-DP+ server sends the remote profile management command to the eUICC, the remote profile management command may be tampered with by an unauthorized device, so that the eUICC executes the tampered remote profile management command (for example, performs an operation such as unauthorized profile activation, unauthorized profile deactivation, or unauthorized profile deletion). Therefore, security of the foregoing remote management is not high.

SUMMARY

Embodiments of the present invention disclose a remote management method and a device, to help improve security of remote management.

According to a first aspect, an embodiment of the present invention discloses a remote management method, and the method includes:

receiving, by a subscription manager-data preparation SM-DP+ server, a first identifier sent by a local profile assistant LPA; searching for, by the SM-DP+ server, a remote profile management command corresponding to the first identifier; and generating, by the SM-DP+ server, a first digital signature according to at least the first identifier and the remote profile management command, and sending at least the first digital signature and the remote profile management command to an embedded universal integrated circuit card eUICC by using the LPA. In this way, after the SM-DP+ server sends at least the first digital signature and the remote profile management command to the eUICC, the eUICC can verify the first digital signature according to at least the first identifier and a public key in a digital certificate of the SM-DP+ that are sent by the LPA to the eUICC and the first digital signature, to determine whether the remote profile management command is tampered with by an unauthorized device, and execute the remote profile management command only when determining that the remote profile management command is not tampered with by the unauthorized device. Therefore, security of remote management is improved.

In a possible design, after receiving the first identifier sent by the local profile assistant LPA, the subscription manager-data preparation SM-DP+ server may further check whether the SM-DP+ server stores an event corresponding to the first identifier; if the SM-DP+ server stores the event corresponding to the first identifier, when the event corresponding to the first identifier is a remote profile management event, the SM-DP+ server does not generate an interaction identifier; and the searching for, by the SM-DP+ server, a remote profile management command corresponding to the first identifier includes: when the event corresponding to the first identifier is a remote profile management event, searching for, by the SM-DP+ server, the remote profile management command corresponding to the first identifier. The interaction identifier is information used to identify interaction. When the event corresponding to the first identifier is a remote profile management event, no interaction identifier is generated, so that the interaction identifier can be replaced with the existing first identifier. This helps reduce a quantity of parameters.

In a possible design, the SM-DP+ server may further receive at least a second digital signature, a digital certificate of the eUICC, and a digital certificate of an eUICC manufacturer EUM that are sent by the eUICC by using the LPA, where the second digital signature is generated by the eUICC according to at least the first identifier; the SM-DP+ server verifies the digital certificate of the EUM and the digital certificate of the eUICC, and verifies the second digital signature by using at least the first identifier and a public key in the digital certificate of the eUICC; and if the verification on the digital certificate of the EUM, the digital certificate of the eUICC, and the second digital signature all succeeds, the SM-DP+ server performs the step of searching for, by the SM-DP+ server, a remote profile management command corresponding to the first identifier.

In a possible design, after sending at least the first digital signature and the remote profile management command to the embedded universal integrated circuit card eUICC by using the LPA, the SM-DP+ server may further send a second message to a subscription manager-discovery service SM-DS server after receiving a first message sent by the LPA, where the second message includes at least an address of the SM-DP+ server, an eUICC identifier, and the first identifier, the second message is used by the SM-DS server to delete at least the address of the SM-DP+, the eUICC identifier, and the first identifier that are sent by the SM-DP+ server, and the first message includes at least the first identifier and a digital signature generated by the eUICC according to the first identifier. In this way, after the eUICC executes the remote profile management command, the SM-DS server can delete, in a timely manner, information (which includes at least the address of the SM-DP+, the eUICC identifier, and the first identifier) that is about the remote profile management command and that is stored in the SM-DS server. Therefore, the executed remote profile command is prevented from being repeatedly executed, and storage space of the SM-DS server is saved.

According to a second aspect, an embodiment of the present invention provides a remote management method, and the method includes: receiving, by an embedded universal integrated circuit card eUICC, at least a first identifier sent by a local profile assistant LPA; receiving, by the eUICC, at least a first digital signature and a remote profile management command that are sent by the LPA, where the first digital signature is generated by a subscription manager-data preparation SM-DP+ server according to at least the first identifier and the remote profile management command; verifying, by the eUICC, the first digital signature according to at least the first identifier and the remote profile management command; and executing, by the eUICC, the remote profile management command if the verification on the first digital signature succeeds. In this way, the eUICC executes the remote profile management command only when the verification succeeds (which indicates that the remote profile management command is not tampered with by an unauthorized device). It can be seen that security of remote management is improved.

In a possible design, after receiving the first identifier sent by the local profile assistant LPA, the embedded universal integrated circuit card eUICC may further generate a second digital signature according to at least the first identifier; and the eUICC sends at least the second digital signature, a digital certificate of the eUICC, and a digital certificate of an eUICC manufacturer EUM to the SM-DP+ server by using the LPA. In an actual application, the eUICC generates the second digital signature according to an interaction identifier. In this way, the interaction identifier is replaced with the first identifier, so that a quantity of parameters is reduced, and the parameters are simplified.

In a possible design, after the verification performed by the eUICC on the first digital signature succeeds, and before the eUICC executes the remote profile management command, if the remote profile management command is a target command, the eUICC may further send a first message to the LPA, where the first message is used to request for user confirmation; and after receiving an execution confirmation message returned by the LPA, the eUICC executes the remote profile management command. The target command may include but is not limited to a profile activation command, a profile deactivation command, or a profile deletion command. In this way, when a profile needs to be activated, deactivated, or deleted, confirmation is requested from a user, so that security of profile information in the eUICC can be effectively improved, and the user can know an operation that is performed on the profile by a remote device. In addition, when the profile is audited (Audit), no user confirmation is required.

In a possible design, after executing the remote profile management command, the eUICC may further generate a remote profile management result of the remote profile management command, where the remote profile management result includes at least the first identifier and a third digital signature generated according to at least the first identifier; and the eUICC sends, to the LPA, the remote profile management result that includes at least the first identifier and the third digital signature. In this way, after executing the remote profile management command, the eUICC feeds back the remote profile management result to the LPA, and the LPA can notify the SM-DP+ server of the remote profile management result, so that the SM-DP+ server can instruct, in a timely manner, an SM-DS server to delete, in a timely manner, information (which includes at least an address of the SM-DP+ server, an eUICC identifier, and the first identifier) that is about the remote profile management command and that is stored in the SM-DS server. Therefore, the executed remote profile command is prevented from being repeatedly executed, and storage space of the SM-DS server is saved.

According to a third aspect, an embodiment of the present invention provides a remote management method, and the method includes: receiving, by a subscription manager-discovery service SM-DS server, a first message sent by a subscription manager-data preparation SM-DP+ server, where the first message includes at least an embedded universal integrated circuit card eUICC identifier and a first identifier; generating, by the SM-DS server, a token after authentication performed by the SM-DS server on an identity of an eUICC succeeds, where the token is a digital signature that is generated according to at least the first identifier, the eUICC identifier, and an address of the SM-DS server; and sending, by the SM-DS server, a second message to a local profile assistant LPA, where the second message includes at least the eUICC identifier, the first identifier, the token, an address of the SM-DP+ server, the address of the SM-DS server, and a digital certificate of the SM-DS server. This helps simplify an interaction procedure in a process in which the SM-DP+ server verifies the identity of the eUICC, so that a whole operation procedure is more simplified.

According to a fourth aspect, an embodiment of the present invention provides a remote management method, and the method includes: receiving, by a subscription manager-data preparation SM-DP+ server, a first message sent by a local profile assistant LPA, where the first message includes at least an embedded universal integrated circuit card eUICC identifier, a first identifier, a token, a digital certificate of an SM-DS server, and an address of the SM-DS server, and the token is a digital signature that is generated by the SM-DS server according to at least the first identifier, the eUICC identifier, and the address of the SM-DS server; verifying, by the SM-DP+ server, the token; if the verification succeeds, verifying, by the SM-DP+ server, whether the address of the SM-DS server matches an address of an SM-DS server corresponding to the first identifier, and verifying whether the eUICC identifier matches an eUICC identifier corresponding to the first identifier; and if the address of the SM-DS server matches the address of the SM-DS server corresponding to the first identifier, and the eUICC identifier matches the eUICC identifier corresponding to the first identifier, determining, by the SM-DP+ server, that authentication on an identity of the eUICC succeeds. This helps simplify an interaction procedure in a process in which the SM-DP+ server verifies the identity of the eUICC, so that a whole operation procedure is more simplified.

In a possible design, the first message further includes a random number generated by the eUICC, and after the SM-DP+ server determines that the authentication on the identity of the eUICC succeeds, when an event corresponding to the first identifier is a remote profile management event, the SM-DP+ server may further generate a first digital signature according to at least the random number and a remote profile management command corresponding to the first identifier; and the SM-DP+ server sends at least the first digital signature, the remote profile management command, and a digital certificate of the SM-DP+ server to the eUICC by using the LPA. The SM-DP+ server generates the first digital signature according to at least the remote profile management command and the random number generated by the eUICC, and provided that verification on the first digital signature succeeds, the eUICC can determine that authentication on an identity of the SM-DP+ server succeeds and that the remote profile management command is not tampered with by an unauthorized device, so that an operation procedure is simplified. In addition, the eUICC executes the remote profile management command only after determining that the remote profile management command is not tampered with by the unauthorized device, so that security of remote profile management is improved.

In a possible design, after receiving a second message sent by the LPA, the SM-DP+ server may further send a third message to the subscription manager-discovery service SM-DS server, where the third message includes at least an address of the SM-DP+ server, the eUICC identifier, and the first identifier, the third message is used by the SM-DS server to delete at least the address of the SM-DP+ server, the eUICC identifier, and the first identifier that are sent by the SM-DP+ server, and the second message includes at least result code and a digital signature generated according to at least the result code. In this way, after the eUICC executes the remote profile management command, the SM-DS server can delete, in a timely manner, information (which includes at least the address of the SM-DP+, the eUICC identifier, and the first identifier) that is about the remote profile management command and that is stored in the SM-DS server. Therefore, the executed remote profile command is prevented from being repeatedly executed, and storage space of the SM-DS server is saved.

According to a fifth aspect, an embodiment of the present invention provides a remote management method, and the method includes: receiving, by an embedded universal integrated circuit card eUICC, a message that includes at least a first digital signature, a remote profile management command, and a digital certificate of a subscription manager-data preparation SM-DP+ server and that is sent by the SM-DP+ server by using a local profile assistant LPA, where the first digital signature is generated by the SM-DP+ server according to at least a random number and the remote profile management command, and the random number is generated by the eUICC; verifying, by the eUICC, the digital certificate of the SM-DP+ server, and verifying the first digital signature by using at least the random number, a public key in the digital certificate of the SM-DP+ server, and the remote profile management command; and executing the remote profile management command if the verification on the digital certificate and the first digital signature succeeds. In this way, provided that the verification on the first digital signature succeeds, the eUICC can determine that authentication on an identity of the SM-DP+ server succeeds and that the remote profile management command is not tampered with by an unauthorized device, so that an operation procedure is simplified. In addition, the eUICC executes the remote profile management command only after determining that the remote profile management command is not tampered with by the unauthorized device, so that security of remote profile management is improved.

In a possible design, after the verification performed by the eUICC on the digital certificate and the digital signature succeeds, and before the eUICC executes the remote profile management command, if the remote profile management command is a target command, the eUICC may further send a first message to the LPA, where the first message is used to request for user confirmation; and after receiving an execution confirmation message returned by the LPA, the eUICC executes the remote profile management command. The target command may include but is not limited to a profile activation command, a profile deactivation command, or a profile deletion command. In this way, when a profile needs to be activated, deactivated, or deleted, confirmation is requested from a user, so that security of profile information in the eUICC can be effectively improved, and the user can know an operation that is performed on the profile by a remote device. In addition, when the profile is audited (Audit), no user confirmation is required.

In a possible design, after executing the remote profile management command, the eUICC may further generate a remote profile management result of the remote profile management command, where the remote profile management result includes at least result code and a digital signature generated according to at least the result code; and the eUICC sends, to the LPA, the remote profile management result that includes at least the result code and the digital signature generated according to at least the result code. In this way, after executing the remote profile management command, the eUICC feeds back the remote profile management result to the LPA, and the LPA can notify the SM-DP+ server of the remote profile management result, so that the SM-DP+ server can instruct, in a timely manner, an SM-DS server to delete, in a timely manner, information (which includes at least an address of the SM-DP+ server, an eUICC identifier, and a first identifier) that is about the remote profile management command and that is stored in the SM-DS server. Therefore, the executed remote profile command is prevented from being repeatedly executed, and storage space of the SM-DS server is saved.

According to a sixth aspect, an embodiment of the present invention provides a subscription manager-data preparation SM-DP+ server. The SM-DP+ server has a function of implementing a behavior of the SM-DP+ server in the designs of the first aspect and the second aspect. The function may be implemented by using hardware, or may be implemented by executing corresponding software by hardware. The hardware or software includes one or more modules corresponding to the foregoing function. The module may be software and/or hardware.

In a possible design, a structure of the SM-DP+ server includes a processor and a transceiver. The processor is configured to support the SM-DP+ server in performing a corresponding function in the foregoing method. The transceiver is configured to support the SM-DP+ server in communicating with another network element. The SM-DP+ server may further include a memory. The memory is configured to be coupled with the processor, and the memory stores a program instruction and data that are required by the SM-DP+ server.

According to a seventh aspect, an embodiment of the present invention provides an embedded universal integrated circuit card eUICC. The eUICC has a function of implementing a behavior of the eUICC in the designs of the first aspect and the second aspect. The function may be implemented by using hardware, or may be implemented by executing corresponding software by hardware. The hardware or software includes one or more modules corresponding to the foregoing function. The module may be software and/or hardware.

In a possible design, a structure of the eUICC includes a processor and a transceiver. The processor is configured to support the eUICC in performing a corresponding function in the foregoing method. The transceiver is configured to support the eUICC in communicating with another network element. The eUICC may further include a memory. The memory is configured to be coupled with the processor, and the memory stores a program instruction and data that are required by the eUICC.

According to an eighth aspect, an embodiment of the present invention provides a subscription manager-discovery service SM-DS server. The SM-DS server has a function of implementing a behavior of the SM-DS server in the designs of the third aspect, the fourth aspect, and the fifth aspect. The function may be implemented by using hardware, or may be implemented by executing corresponding software by hardware. The hardware or software includes one or more modules corresponding to the foregoing function. The module may be software and/or hardware.

In a possible design, a structure of the SM-DS server includes a processor and a transceiver. The processor is configured to support the SM-DS server in performing a corresponding function in the foregoing method. The transceiver is configured to support the SM-DS server in communicating with another network element. The SM-DS server may further include a memory. The memory is configured to be coupled with the processor, and the memory stores a program instruction and data that are required by the SM-DS server.

According to a ninth aspect, an embodiment of the present invention provides a subscription manager-data preparation SM-DP+ server. The SM-DP+ server has a function of implementing a behavior of the SM-DP+ server in the designs of the third aspect, the fourth aspect, and the fifth aspect. The function may be implemented by using hardware, or may be implemented by executing corresponding software by hardware. The hardware or software includes one or more modules corresponding to the foregoing function. The module may be software and/or hardware.

In a possible design, a structure of the SM-DP+ server includes a processor and a transceiver. The processor is configured to support the SM-DP+ server in performing a corresponding function in the foregoing method. The transceiver is configured to support the SM-DP+ server in communicating with another network element. The SM-DP+ server may further include a memory. The memory is configured to be coupled with the processor, and the memory stores a program instruction and data that are required by the SM-DP+ server.

According to a tenth aspect, an embodiment of the present invention provides an embedded universal integrated circuit card eUICC. The eUICC has a function of implementing a behavior of the eUICC in the designs of the fourth aspect and the fifth aspect. The function may be implemented by using hardware, or may be implemented by executing corresponding software by hardware. The hardware or software includes one or more modules corresponding to the foregoing function. The module may be software and/or hardware.

In a possible design, a structure of the eUICC includes a processor and a transceiver. The processor is configured to support the eUICC in performing a corresponding function in the foregoing method. The transceiver is configured to support the eUICC in communicating with another network element. The eUICC may further include a memory. The memory is configured to be coupled with the processor, and the memory stores a program instruction and data that are required by the eUICC.

According to an eleventh aspect, an embodiment of the present invention provides a computer storage medium, configured to store a computer software instruction used by the SM-DP+ server in the sixth aspect, where the computer software instruction includes a program designed to execute the foregoing aspect.

According to a twelfth aspect, an embodiment of the present invention provides a computer storage medium, configured to store a computer software instruction used by the eUICC in the seventh aspect, where the computer software instruction includes a program designed to execute the foregoing aspect.

According to a thirteenth aspect, an embodiment of the present invention provides a computer storage medium, configured to store a computer software instruction used by the SM-DS server in the eighth aspect, where the computer software instruction includes a program designed to execute the foregoing aspect.

According to a fourteenth aspect, an embodiment of the present invention provides a computer storage medium, configured to store a computer software instruction used by the SM-DP+ server in the ninth aspect, where the computer software instruction includes a program designed to execute the foregoing aspect.

According to a fifteenth aspect, an embodiment of the present invention provides a computer storage medium, configured to store a computer software instruction used by the eUICC in the tenth aspect, where the computer software instruction includes a program designed to execute the foregoing aspect.

Compared with the prior art, in the embodiments of the present invention, after receiving the first identifier sent by the LPA, the SM-DP+ server finds the remote profile management command corresponding to the first identifier; and the SM-DP+ server generates the first digital signature according to at least the remote profile management command and the first identifier, and sends at least the first digital signature and the remote profile management command to the eUICC by using the LPA. Therefore, after receiving the first digital signature and the remote profile management command, the eUICC can verify the first digital signature according to at least the first identifier and the public key in the digital certificate of the SM-DP+ that are sent by the LPA to the eUICC. The eUICC executes the remote profile management command only when the verification succeeds (which indicates that the remote profile management command is not tampered with by the unauthorized device). It can be seen that according to the embodiments of the present invention, the eUICC can determine whether the remote profile management command is tampered with by the unauthorized device, and execute the remote profile management command only when determining that the remote profile management command is not tampered with by the unauthorized device. Therefore, security of remote management is improved.

Compared with the prior art, in the embodiments of the present invention, the SM-DS server may generate the token according to at least the eUICC identifier and the address of the SM-DS server, and send at least the token to the LPA. In this way, the LPA can send the token to the SM-DP+ server. After receiving the token sent by the LPA, the SM-DP+ server verifies the token. After the verification succeeds, if the SM-DP+ server determines, through verification, that the address of the SM-DS server matches the address of the SM-DS server corresponding to the first identifier, and the eUICC identifier matches the eUICC identifier corresponding to the first identifier, the SM-DP+ server determines that the authentication on the identity of the eUICC succeeds. It can be seen that, in the embodiments of the present invention, the interaction procedure in the process in which the SM-DP+ server verifies the identity of the eUICC is simplified, so that the whole operation procedure is more simplified.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are only some but not all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", and so on are intended to distinguish between different objects but do not indicate a particular order. In addition, the terms "include", "have", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

In an existing remote management process, when an SM-DP+ server sends a remote profile management command to an eUICC, the remote profile management command may be tampered with by an unauthorized device, so that the eUICC executes the tampered remote profile management command (for example, performs an operation such as unauthorized profile activation, unauthorized profile deactivation, or unauthorized profile deletion). Therefore, security of the existing remote management is not high.

To improve the security of the remote management, the embodiments of the present invention disclose a remote management method and a device. The method and the device are based on a same invention concept. Because problem-resolving principles of the method and the device are similar, for implementation of the device and the method, refer to the device and the method mutually. No repeated description is provided.

To clearly describe the solutions in the embodiments of the present invention, a service scenario and a system architecture that are possibly used in the embodiments of the present invention are described below with reference to FIG. 2.

Figure 1A:
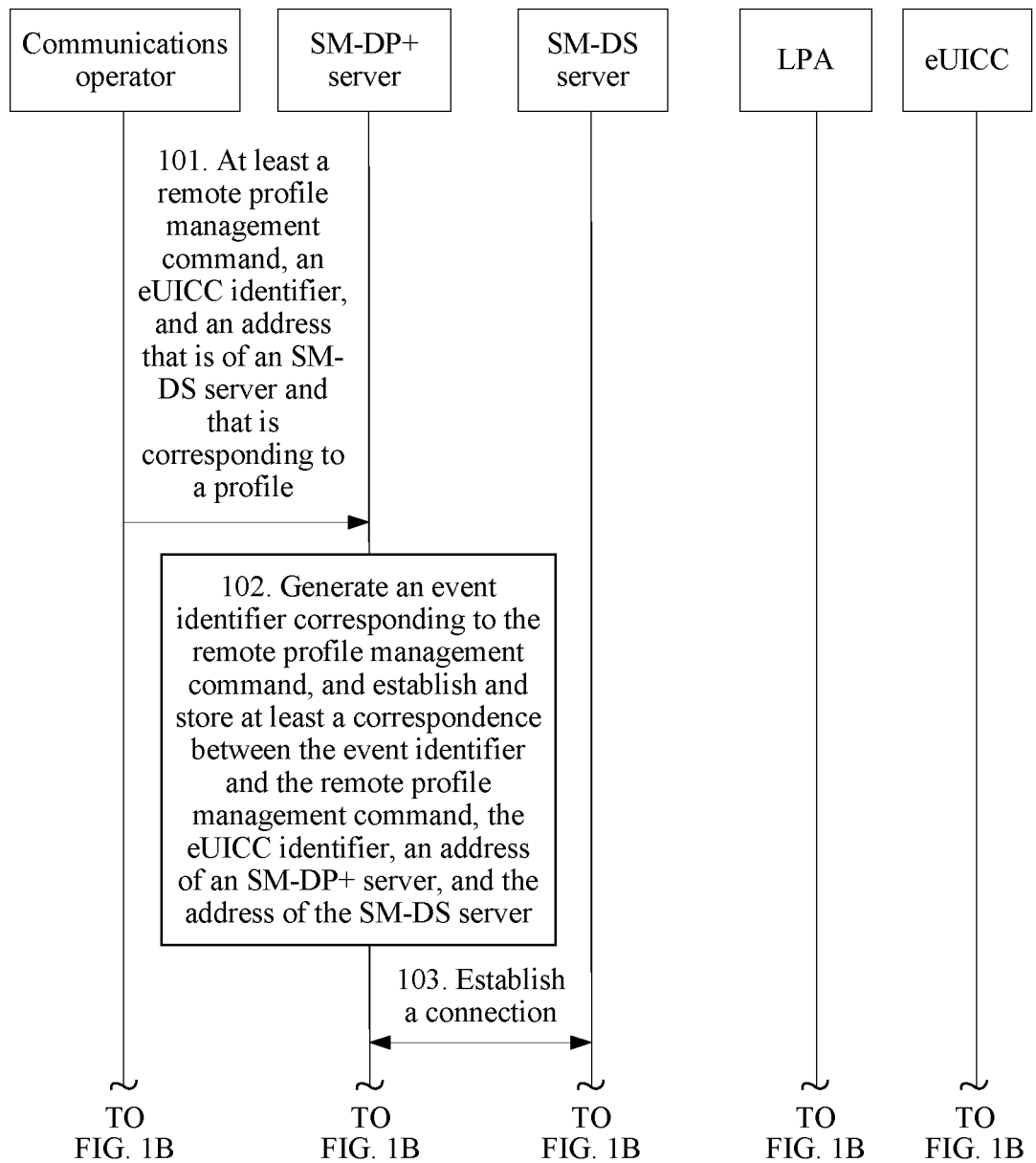
FIG. 1A and FIG. 1B are schematic flowcharts of existing remote management according to an embodiment of the present invention.
Figure 1B:
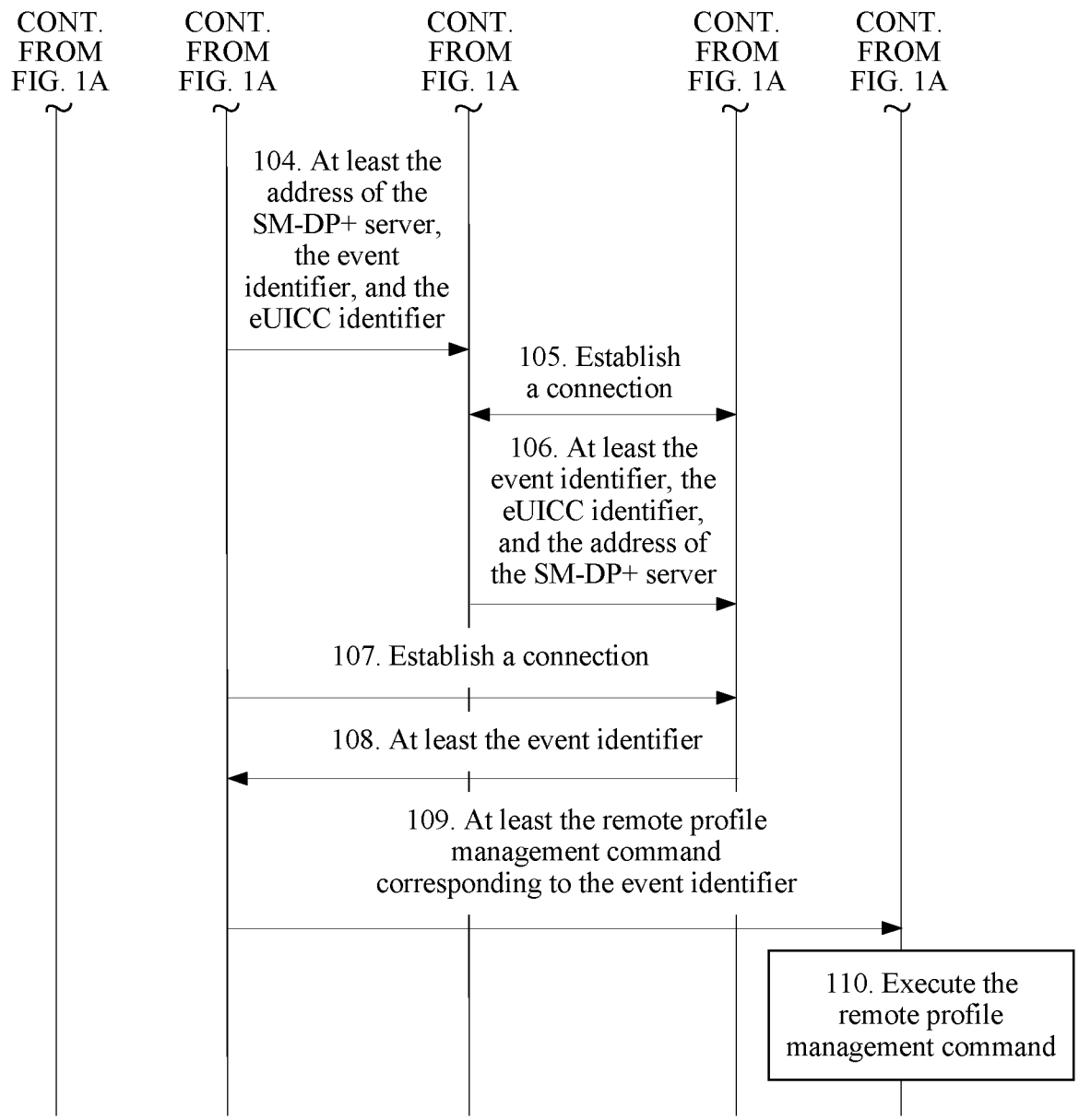
Figure 2:
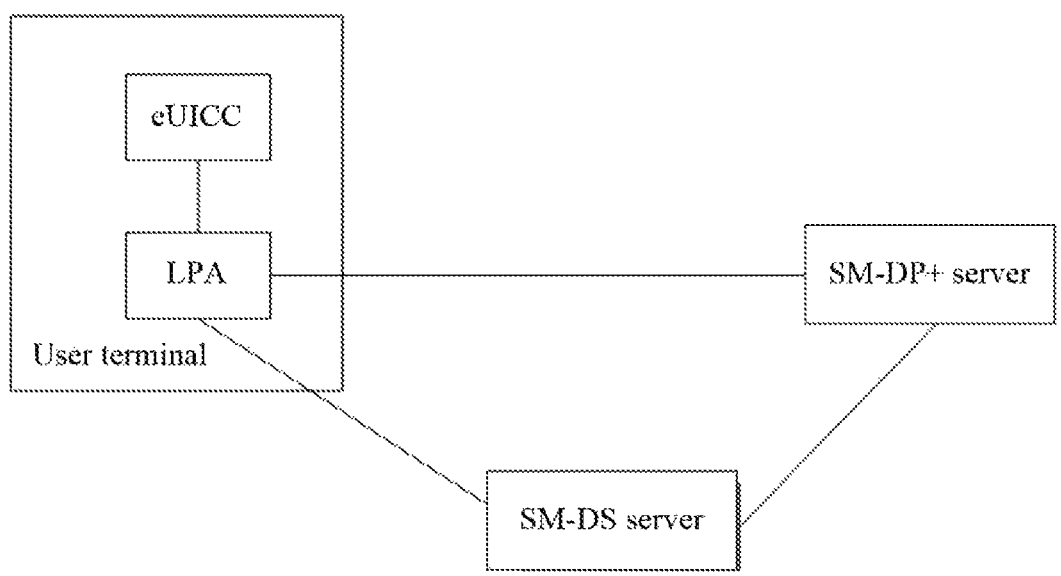
FIG. 2 is a possible diagram of a system architecture according to an embodiment of the present invention.

Referring to FIG. 2, FIG. 2 is a possible diagram of a system architecture according to an embodiment of the present invention. As shown in FIG. 2, the system architecture includes a user terminal, an SM-DP+ server, and an SM-DS server.

The user terminal may include various electronic devices, such as a mobile phone, a tablet computer, a personal digital assistant (Personal Digital Assistant, PDA), a television, an in-vehicle device, a machine-to-machine (Machine to Machine, M2M) device, a mobile Internet device (Mobile Internet Device, MID), and an intelligent wearable device (such as a smartwatch and a smart band). An eUICC and an LPA are disposed in the user terminal. The LPA may be deployed in the eUICC, or the LPA and the eUICC may be deployed independently.

Optionally, the LPA may include a local profile download (Local Profile Download, LPD) module, a local user interface (Local User Interface, LUI) module, and a local discovery service (Local Discovery Service, LDS) module. Generally, the LPA in the user terminal is responsible for interaction between the user terminal and the eUICC, the LPD module is mainly responsible for profile download, the LDS module is mainly responsible for service discovery, and the LUI module provides a user with a UI interface. The user may manage, by using the LPA, a profile downloaded to the eUICC, for example, perform an operation such as profile activation, deactivation, or deletion.

In the system architecture shown in FIG. 2, the SM-DP+ server may send a remote profile management command to the eUICC by using the LPA, so that the eUICC executes the remote profile management command, to implement remote management. Remote profile management includes profile activation, profile deactivation, profile deletion, eUICC status audit, and the like.

A main function of the SM-DS server is to provide a mechanism for enabling the SM-DP+ server to communicate with the LPA. The LPA may obtain an address of the SM-DP+ server from the SM-DS server, so that the LPA can communicate with the SM-DP+ server. The SM-DS server in this specification may be a specific SM-DS server, or may be a collective term for multi-level SM-DS servers.

In the system architecture shown in FIG. 2, when a communications operator needs to perform a remote operation on a profile (for example, download a profile to the eUICC or perform remote management on a profile in the eUICC), the communications operator sends, to the SM-DP+ server, an operation command (for example, a profile download command or a remote profile management command), an eUICC identifier (which is used to identify the eUICC), and an address that is of an SM-DS server and that is corresponding to the profile. After receiving the operation command, the eUICC identifier, and the address of the SM-DS server, the SM-DP+ server generates an event identifier corresponding to the operation command. The identifier may also be referred to as a notification identifier or a notification identifier. The event identifier is used to identify an event, and the event includes a profile download event and a remote profile management event. For example, if the event is a profile download event, the SM-DP+ server generates an identifier of the profile download event. If the event is a remote profile management event, the SM-DP+ server generates an identifier of the remote profile management. The SM-DP+ server establishes at least a correspondence between the event identifier and the operation command, the eUICC identifier, the address of the SM-DP+ server, and the address of the SM-DS server, and stores the correspondence.

In the system architecture shown in FIG. 2, after generating the event identifier corresponding to the operation command, the SM-DP+ server sends, according to the address of the SM-DS server, at least the event identifier, the eUICC identifier, and the address of the SM-DP+ server to the SM-DS server for registering.

In the system architecture shown in FIG. 2, the eUICC stores the address of the SM-DS server, and the LPA connects to the SM-DS server according to the address that is of the SM-DS server and that is provided by the eUICC. Optionally, after the LPA establishes a connection to the SM-DS server, the SM-DS server and the eUICC may perform mutual authentication by using the LPA (that is, the eUICC performs authentication on an identity of the SM-DS server, and the SM-DS server performs authentication on an identity of the eUICC). After the mutual authentication succeeds, the SM-DS server sends, to the LPA, at least the event identifier, the eUICC identifier, and the address of the SM-DP+ server that are registered by the SM-DP+ server.

It can be understood that the system architecture and the service scenario described in the embodiments of the present invention are intended to describe the technical solutions in the embodiments of the present invention more clearly, and impose no limitation on the technical solutions provided in the embodiments of the present invention. A person of ordinary skill in the art may know that, with evolution of the system architecture and emergence of a new service scenario, the technical solutions provided in the embodiments of the present invention are also applicable to a similar technical issue.

Based on foregoing common aspects included in the embodiments of the present invention, the following further describes the embodiments of the present invention in detail.

Figure 3:
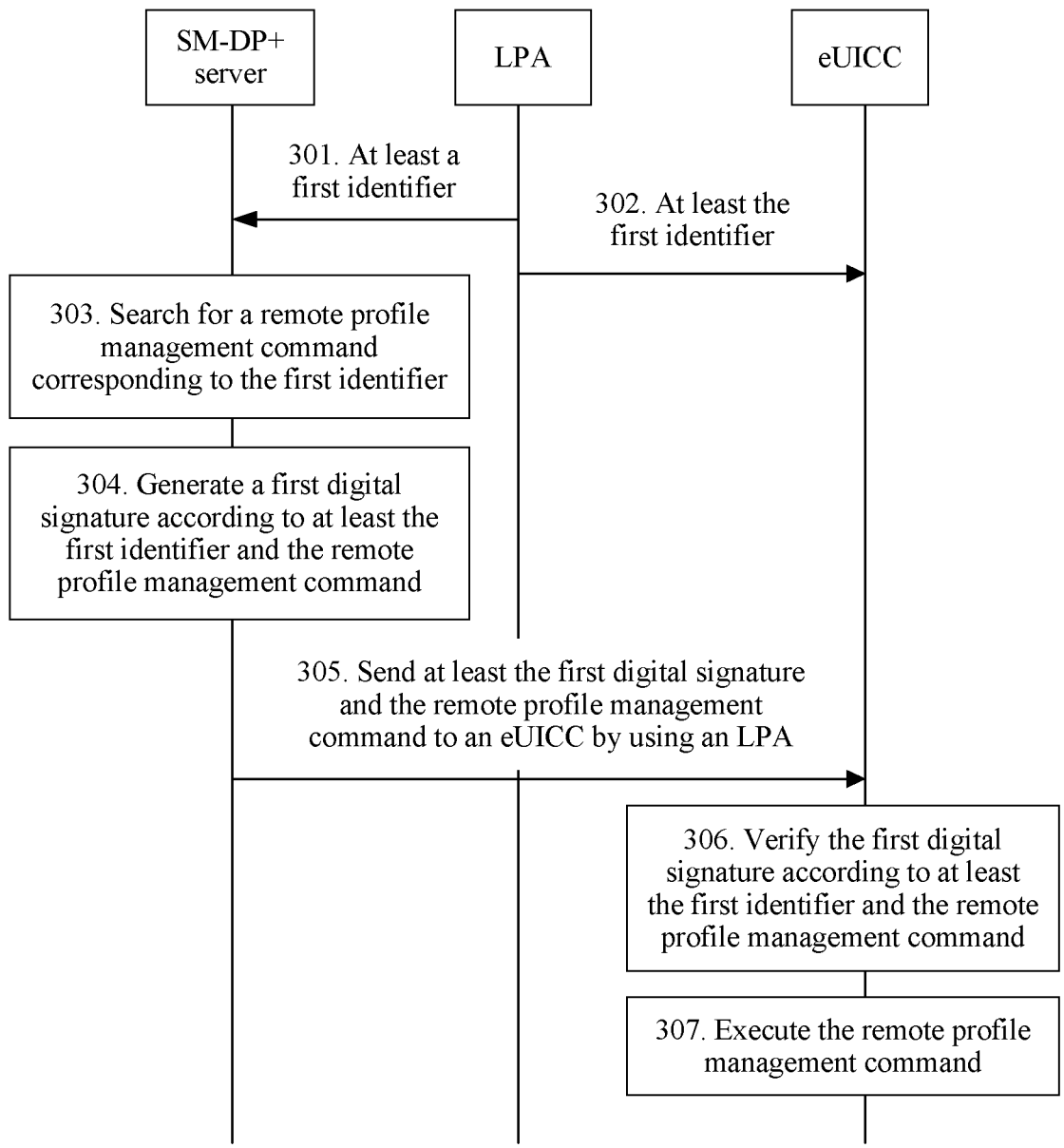
FIG. 3 is a schematic flowchart of a remote management method according to an embodiment of the present invention.

Referring to FIG. 3, FIG. 3 is a schematic flowchart of a remote management method according to an embodiment of the present invention. As shown in FIG. 3, the remote management method may include steps 301 to 307.

301. An LPA sends at least a first identifier to an SM-DP+ server.

In this embodiment of the present invention, the first identifier is an event identifier. The first identifier is registered by the SM-DP+ server in an SM-DS server. After the SM-DS server and an eUICC perform mutual authentication, the first identifier is sent by the SM-DS server to the LPA. After the SM-DS server and the eUICC perform the mutual authentication, the SM-DS server further sends an address of the SM-DP+ server to the LPA. After receiving at least the address of the SM-DP+ server and the first identifier, the LPA connects to the SM-DP+ server according to the address of the SM-DP+ server, and sends at least the first identifier to the SM-DP+ server after establishing a connection to the SM-DP+ server.

302. The LPA sends at least the first identifier to an eUICC.

In this embodiment of the present invention, after the LPA sends at least the first identifier to the SM-DP+ server, the LPA sends at least the first identifier to the eUICC. Optionally, step 302 and step 303 are not performed in sequence, and step 302 may be performed first, or step 303 may be performed first.

303. The SM-DP+ server searches for a remote profile management command corresponding to the first identifier.

In this embodiment of the present invention, after the SM-DP+ server receives the first identifier, if the first identifier is an event identifier corresponding to a remote profile management event, the SM-DP+ server obtains the remote profile management command corresponding to the first identifier.

304. The SM-DP+ server generates a first digital signature according to at least the first identifier and the remote profile management command.

In this embodiment of the present invention, a specific implementation in which the SM-DP+ server generates the first digital signature according to at least the first identifier and the remote profile management command may be as follows: The SM-DP+ server generates a data structure according to at least the first identifier and the remote profile management command, and then calculates the first digital signature according to the data structure by using a private key of the SM-DP+ server.

Optionally, the SM-DP+ server may perform a hash operation on the first identifier and the remote profile management command, to obtain a message digest, and then encrypt the message digest by using a private key of the SM-DP+ server, to obtain the first digital signature.

305. The SM-DP+ server sends at least the first digital signature and the remote profile management command to the eUICC by using the LPA.

In this embodiment of the present invention, after generating the first digital signature, the SM-DP+ server sends at least the first digital signature and the remote profile management command to the LPA, so that the LPA sends at least the first digital signature and the remote profile management command to the eUICC.

306. The eUICC verifies the first digital signature according to at least the first identifier and the remote profile management command.

In this embodiment of the present invention, after receiving the first identifier, the remote profile management command, and the first digital signature that are sent by the LPA, the eUICC verifies the first digital signature by using at least the first identifier and the remote profile management command.

Optionally, a specific implementation in which the eUICC verifies the first digital signature by using at least the first identifier and the remote profile management command may be as follows: The eUICC decrypts the first digital signature by using a public key in a previously received digital certificate of the SM-DP+ server, to obtain a message digest, and then performs a hash operation on the first identifier and the remote profile management command, to obtain a new message digest; the eUICC compares the message digest, obtained after decryption, with the new message digest; and if the message digest obtained after decryption is consistent with the new message digest, the eUICC determines that the verification on the first digital signature succeeds, that is, the remote profile management command is not tampered with.

307. The eUICC executes the remote profile management command.

In this embodiment of the present invention, if the eUICC determines that the verification on the first digital signature succeeds, the eUICC executes the remote profile management command.

In the method described in FIG. 3, after receiving the first identifier sent by the LPA, the SM-DP+ server obtains the remote profile management command corresponding to the first identifier; and the SM-DP+ server generates the first digital signature according to at least the remote profile management command and the first identifier, and sends at least the first digital signature and the remote profile management command to the eUICC by using the LPA. Therefore, after receiving the first digital signature and the remote profile management command, the eUICC can verify the first digital signature according to at least the first identifier and the public key in the digital certificate of the SM-DP+ that are sent by the LPA to the eUICC. The eUICC executes the remote profile management command only when the verification succeeds (which indicates that the remote profile management command is not tampered with by an unauthorized device). It can be seen that, in the embodiment described in FIG. 3, the eUICC can determine whether the remote profile management command is tampered with by the unauthorized device, and execute the remote profile management command only when determining that the remote profile management command is not tampered with by the unauthorized device. Therefore, security of remote management is improved.

Figure 4A:
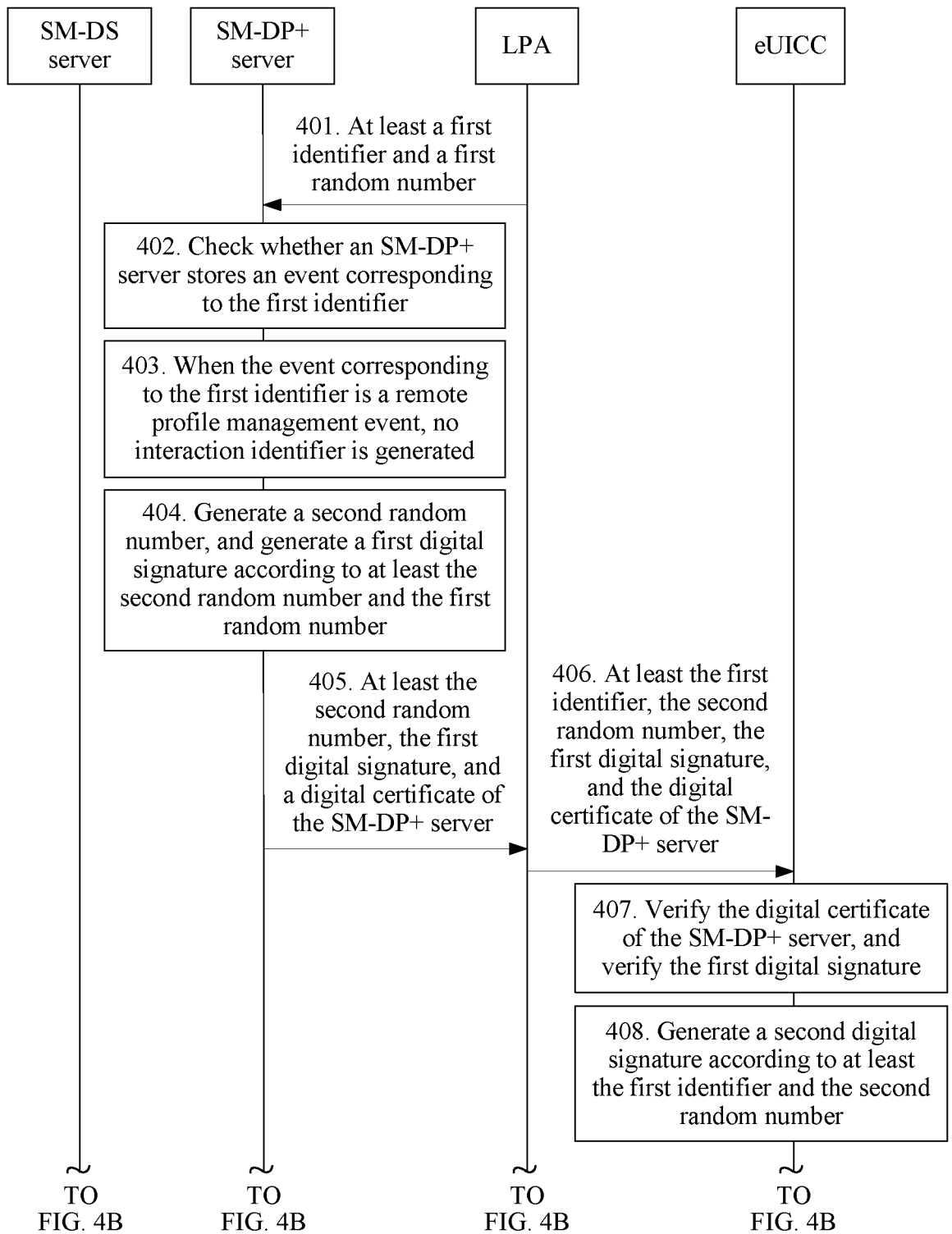
FIG. 4A, FIG. 4B, and FIG. 4C are schematic flowcharts of another remote management method according to an embodiment of the present invention.
Figure 4B:
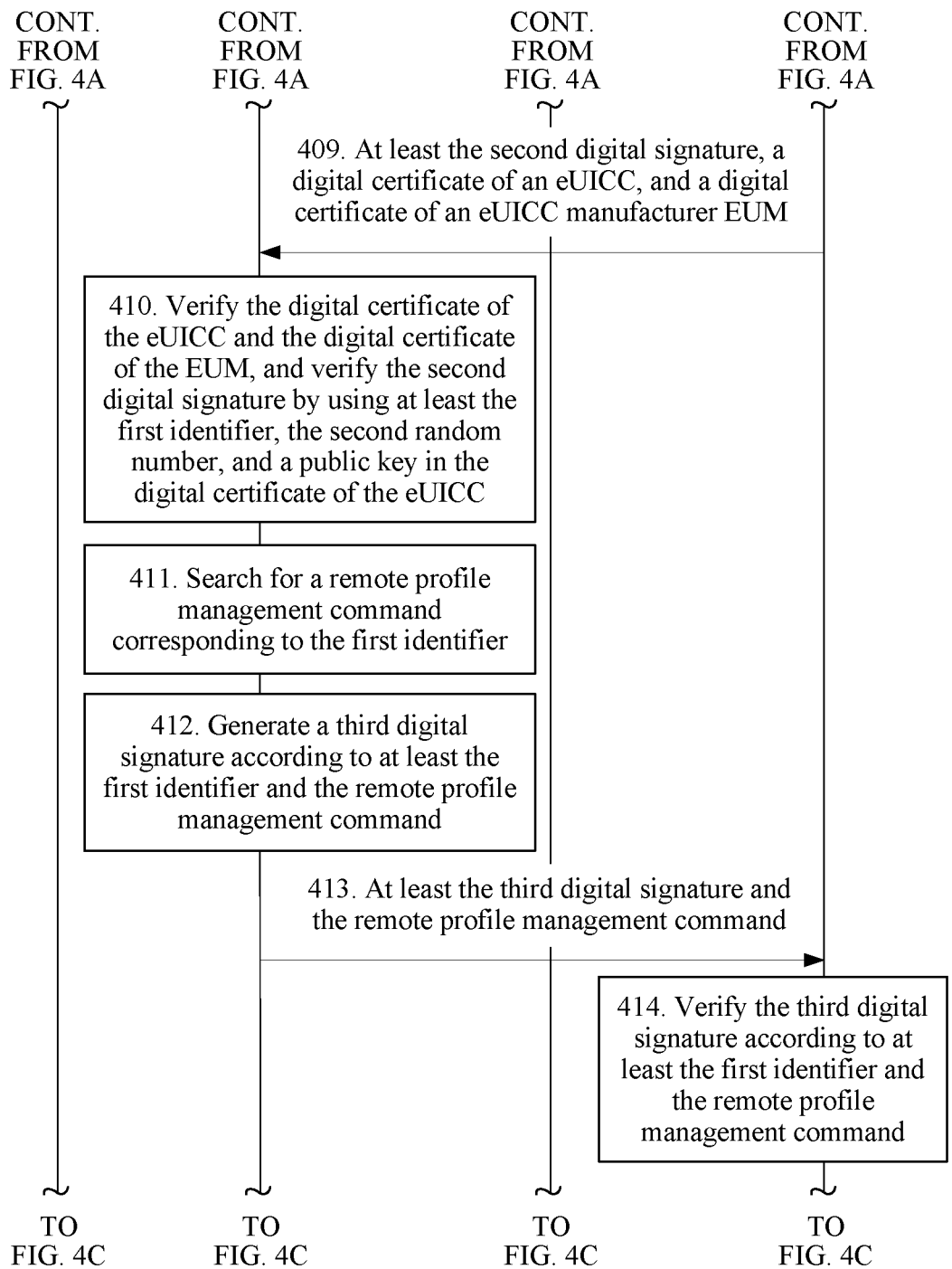
Figure 4C:
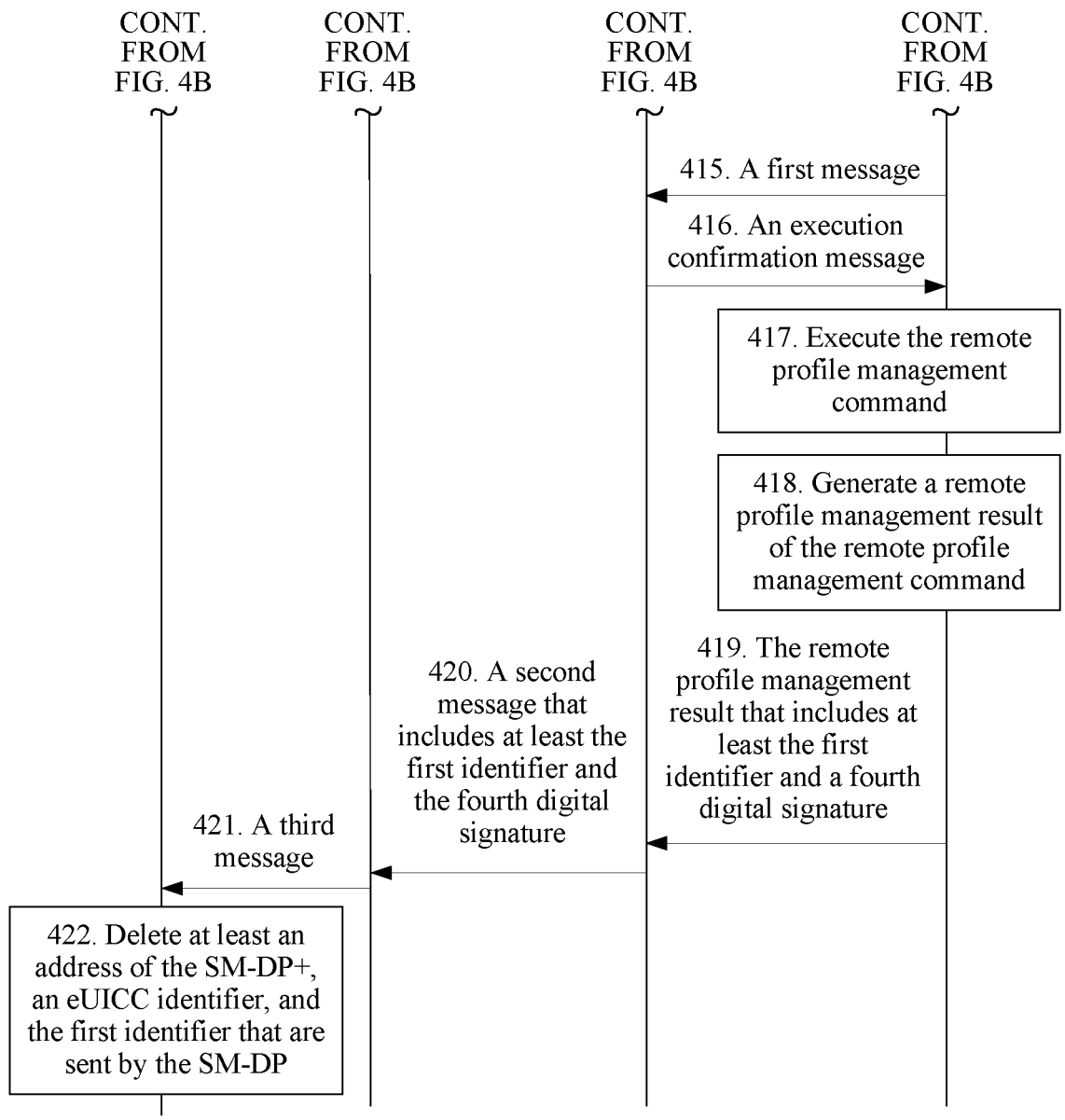

Referring to FIG. 4A, FIG. 4B, and FIG. 4C, FIG. 4A, FIG. 4B, and FIG. 4C are schematic flowcharts of another remote management method according to an embodiment of the present invention. As shown in FIG. 4A, FIG. 4B, and FIG. 4C, the remote management method may include steps 401 to 422.

401. An LPA sends at least a first identifier and a first random number to an SM-DP+ server.

In this embodiment of the present invention, the first random number is sent by an eUICC to the LPA. After receiving an address of the SM-DP+ server, the first identifier, and an eUICC identifier that are sent by an SM-DS server, the LPA triggers the eUICC to generate the first random number. After generating the first random number, the eUICC sends the first random number to the LPA. After receiving the first random number, the LPA sends at least the first random number and the first identifier to the SM-DP+ server according to the address of the SM-DP+ server. After generating the first random number, the eUICC stores the first random number.

402. The SM-DP+ server checks whether the SM-DP+ server stores an event corresponding to the first identifier.

In this embodiment of the present invention, the event includes a remote profile management event and a profile download event. If the SM-DP+ server finds that the SM-DP+ server stores the event corresponding to the first identifier, the SM-DP+ server performs step 403.

403. When the event corresponding to the first identifier is a remote profile management event, the SM-DP+ server does not generate an interaction identifier.

In this embodiment of the present invention, the interaction identifier is information used to identify interaction. When the event corresponding to the first identifier is a remote profile management event, no interaction identifier is generated, so that the interaction identifier can be replaced with the existing event identifier. This helps reduce a quantity of parameters.

404. The SM-DP+ server generates a second random number, and generates a first digital signature according to at least the second random number and the first random number.

In this embodiment of the present invention, after the SM-DP+ server finds that the SM-DP+ server stores the event corresponding to the first identifier, the SM-DP+ server generates the second random number, and generates the first digital signature according to at least the second random number and the first random number. After generating the second random number, the SM-DP+ server stores the second random number.

In this embodiment of the present invention, a specific implementation in which the SM-DP+ server generates the first digital signature according to at least the second random number and the first random number may be: generating a data structure according to at least the second random number and the first random number, and then calculating the first digital signature according to the data structure by using a private key of the SM-DP+ server.

Optionally, a specific implementation in which the SM-DP+ server generates the first digital signature according to at least the second random number and the first random number may be as follows: The SM-DP+ server performs a hash operation on at least the second random number and the first random number, to obtain a message digest, and then encrypts the message digest by using a private key of the SM-DP+ server, to obtain the first digital signature.

405. The SM-DP+ server sends at least the second random number, the first digital signature, and a digital certificate of the SM-DP+ server to the LPA.

406. The LPA sends at least the first identifier, the second random number, the first digital signature, and the digital certificate of the SM-DP+ server to an eUICC.

407. The eUICC verifies the digital certificate of the SM-DP+ server, and verifies the first digital signature.

In this embodiment of the present invention, after receiving the first identifier, the second random number, the first digital signature, and the digital certificate of the SM-DP+ server, the eUICC verifies the digital certificate of the SM-DP+ server by using a public key of a certificate issuer (Certificate Issuer). After the verification on the digital certificate of the SM-DP+ server succeeds, the eUICC obtains a public key of the SM-DP+ server in the digital certificate of the SM-DP+ server, and verifies the first digital signature by using at least the public key of the SM-DP+ server, the second random number, and the first random number stored in the eUICC.

Optionally, a specific implementation in which the eUICC verifies the first digital signature by using at least the public key of the SM-DP+ server, the first random number, and the second random number may be as follows: The eUICC decrypts the first digital signature by using the public key of the SM-DP+ server, to obtain a message digest; performs a hash operation according to at least the second random number and the first random number that is previously generated by the eUICC and that is stored in the eUICC, to obtain a new message digest; compares the message digest, obtained after decryption, with the new message digest; and if the message digest obtained after decryption is consistent with the new message digest, determines that the verification on the first digital signature succeeds. If determining that the verification on the first digital signature succeeds, the eUICC performs step 408.

408. The eUICC generates a second digital signature according to at least the first identifier and the second random number.

In this embodiment of the present invention, a specific implementation in which the eUICC generates the second digital signature according to at least the first identifier and the second random number may be: generating a data structure according to at least the first identifier and the second random number, and calculating the second digital signature according to the data structure by using a private key of the eUICC.

In this embodiment of the present invention, optionally, the eUICC performs a hash operation on the first identifier and the second random number, to obtain a message digest, and then encrypts the message digest by using a private key of the eUICC, to obtain the second digital signature.

409. The eUICC sends at least the second digital signature, a digital certificate of the eUICC, and a digital certificate of an eUICC manufacturer EUM to the SM-DP+ server by using the LPA.

In this embodiment of the present invention, after generating the second digital signature, the eUICC sends at least the second digital signature, the digital certificate of the eUICC, and the digital certificate of the EUM to the SM-DP+ server by using the LPA.

410. The SM-DP+ server verifies the digital certificate of the eUICC and the digital certificate of the EUM, and verifies the second digital signature by using at least the first identifier, the second random number, and a public key in the digital certificate of the eUICC.

In this embodiment of the present invention, after receiving the second digital signature and the digital certificate of the eUICC, the SM-DP+ server verifies the digital certificate of the EUM by using a public key of a certificate issuer (Certificate Issuer), and if the verification succeeds, determines that the verification on the digital certificate of the EUM succeeds. Then, the SM-DP+ server verifies the digital certificate of the eUICC by using a public key in the digital certificate of the EUM, and if the verification succeeds, determines that the verification on the digital certificate of the eUICC succeeds. After determining that the verification on the digital certificate of the eUICC succeeds, the SM-DP+ server verifies the second digital signature by using at least the second random number, the public key in the digital certificate of the eUICC, and the first identifier.

Optionally, a specific implementation in which the SM-DP+ server verifies the second digital signature by using at least the second random number, the public key in the digital certificate of the eUICC, and the first identifier may be as follows: The SM-DP+ server decrypts the second digital signature by using the public key in the digital certificate of the eUICC, to obtain a message digest, and then performs a hash operation according to at least the first identifier and the second random number that is previously generated by the SM-DP+ server and that is stored in the SM-DP+ server, to obtain a new message digest; the SM-DP+ server compares the message digest, obtained after decryption, with the new message digest; and if the message digest obtained after decryption is consistent the new message digest, the SM-DP+ server determines that the verification on the second digital signature succeeds. After the verification on the second digital signature succeeds, the SM-DP+ server performs step 411.

In an actual application, the eUICC generates the second digital signature according to an interaction identifier. Correspondingly, the SM-DP+ server also verifies the second digital signature according to the interaction identifier. After steps 408 to 410 are performed, the eUICC generates the second digital signature by replacing the interaction identifier with the existing first identifier. Correspondingly, the SM-DP+ server verifies the second digital signature according to the first identifier stored in the SM-DP+ server. In this way, the interaction identifier is replaced with the first identifier, so that a quantity of parameters is reduced, and the parameters are simplified.

411. The SM-DP+ server searches for a remote profile management command corresponding to the first identifier.

412. The SM-DP+ server generates a third digital signature according to at least the first identifier and the remote profile management command.

In this embodiment of the present invention, the third digital signature is the first digital signature in the embodiment shown in FIG. 3. Step 412 is similar to step 304 in FIG.

3. For step 412, refer to descriptions of step 304 in FIG. 3. Details are not described herein again.

413. The SM-DP+ server sends at least the third digital signature and the remote profile management command to the eUICC by using the LPA.

In this embodiment of the present invention, step 413 is similar to step 305 in FIG. 3. For step 413, refer to descriptions of step 305 in FIG. 3. Details are not described herein again.

414. The eUICC verifies the third digital signature according to at least the first identifier and the remote profile management command.

In this embodiment of the present invention, step 414 is similar to step 306 in FIG. 3. For step 414, refer to descriptions of step 306 in FIG. 3. Details are not described herein again.

415. The eUICC sends a first message to the LPA.

In this embodiment of the present invention, if the eUICC determines that the verification on the third digital signature succeeds, and the remote profile management command is a target command, the eUICC sends, to the LPA, the first message used to request for user confirmation. After receiving the first message, the LPA may present the user confirmation by using an LUI module. Optionally, the target command may include but is not limited to a profile activation command, a profile deactivation command, or a profile deletion command.

416. The LPA returns an execution confirmation message to the eUICC.

In this embodiment of the present invention, when the LPA receives an instruction that is used to confirm execution of the remote profile management command and that is entered by a user, the LPA returns the execution confirmation message to the eUICC.

417. The eUICC executes the remote profile management command.

In this embodiment of the present invention, after receiving the execution confirmation message, the eUICC executes the remote profile management command.

After steps 415 to 417 are performed, when a profile needs to be activated, deactivated, or deleted, confirmation is requested from the user, so that security of profile information in the eUICC can be effectively improved, and the user can know an operation that is performed on the profile by a remote device.

418. The eUICC generates a remote profile management result of the remote profile management command.

In this embodiment of the present invention, after executing the remote profile management command, the eUICC generates the remote profile management result of the remote profile management command. The remote profile management result includes at least the first identifier and a fourth digital signature generated according to the first identifier. Optionally, the remote profile management result may further include result code and the address of the SM-DP+ server. Optionally, the fourth digital signature may be generated according to the first identifier, the result code, and the address of the SM-DP+ server.

419. The eUICC sends, to the LPA, the remote profile management result that includes at least the first identifier and a fourth digital signature.

In this embodiment of the present invention, after generating the remote profile management result, the eUICC sends, to the LPA, the remote profile management result that includes at least the first identifier and the fourth digital signature. Optionally, if the remote profile management result further includes the result code and the address of the SM-DP+ server, the eUICC may further send the result code and the address of the SM-DP+ server to the LPA.

420. The LPA sends, to the SM-DP+ server, a second message that includes at least the first identifier and the fourth digital signature.

In this embodiment of the present invention, after receiving the remote profile management result, the LPA sends the second message to the SM-DP+ server. The second message includes at least the first identifier and the fourth digital signature that are in the remote profile management result.

Optionally, if the remote profile management result further includes the result code and the address of the SM-DP+ server, the second message may further include the result code and the address of the SM-DP+ server.

421. The SM-DP+ server sends a third message to an SM-DS server.

In this embodiment of the present invention, after the SM-DP+ server receives the second message, the SM-DS server sends the third message to the SM-DS server. The third message includes at least the address of the SM-DP+ server, the eUICC identifier, and the first identifier, and the third message is used by the SM-DS server to delete at least the address of the SM-DP+ server, the eUICC identifier, and the first identifier that are sent by the SM-DP+ server.

422. The SM-DS server deletes at least an address of the SM-DP+, an eUICC identifier, and the first identifier that are sent by the SM-DP+ server.

In this embodiment of the present invention, after receiving the third message, the SM-DS server deletes at least the address of the SM-DP+, the eUICC identifier, and the first identifier that are sent by the SM-DP+ server.

After the eUICC executes the remote profile management command, step 418 and step 422 are performed, and the SM-DS server can delete, in a timely manner, at least the address of the SM-DP+, the eUICC identifier, and the first identifier that are stored in the SM-DS server, so that storage space of the SM-DS server can be saved.

In the method described in FIG. 4A, FIG. 4B, and FIG. 4C, after receiving the first identifier sent by the LPA, the SM-DP+ server searches for the remote profile management command corresponding to the first identifier; and the SM-DP+ server generates the third digital signature according to at least the remote profile management command and the first identifier, and sends at least the third digital signature and the remote profile management command to the eUICC by using the LPA. Therefore, after receiving the third digital signature and the remote profile management command, the eUICC can verify the third digital signature according to at least the first identifier and the public key in the digital certificate of the SM-DP+ that are sent by the LPA to the eUICC. The eUICC executes the remote profile management command only when the verification succeeds (which indicates that the remote profile management command is not tampered with by an unauthorized device). It can be seen that security of remote management is improved by using the method described in FIG. 4A, FIG. 4B, and FIG. 4C.

Figure 5A:
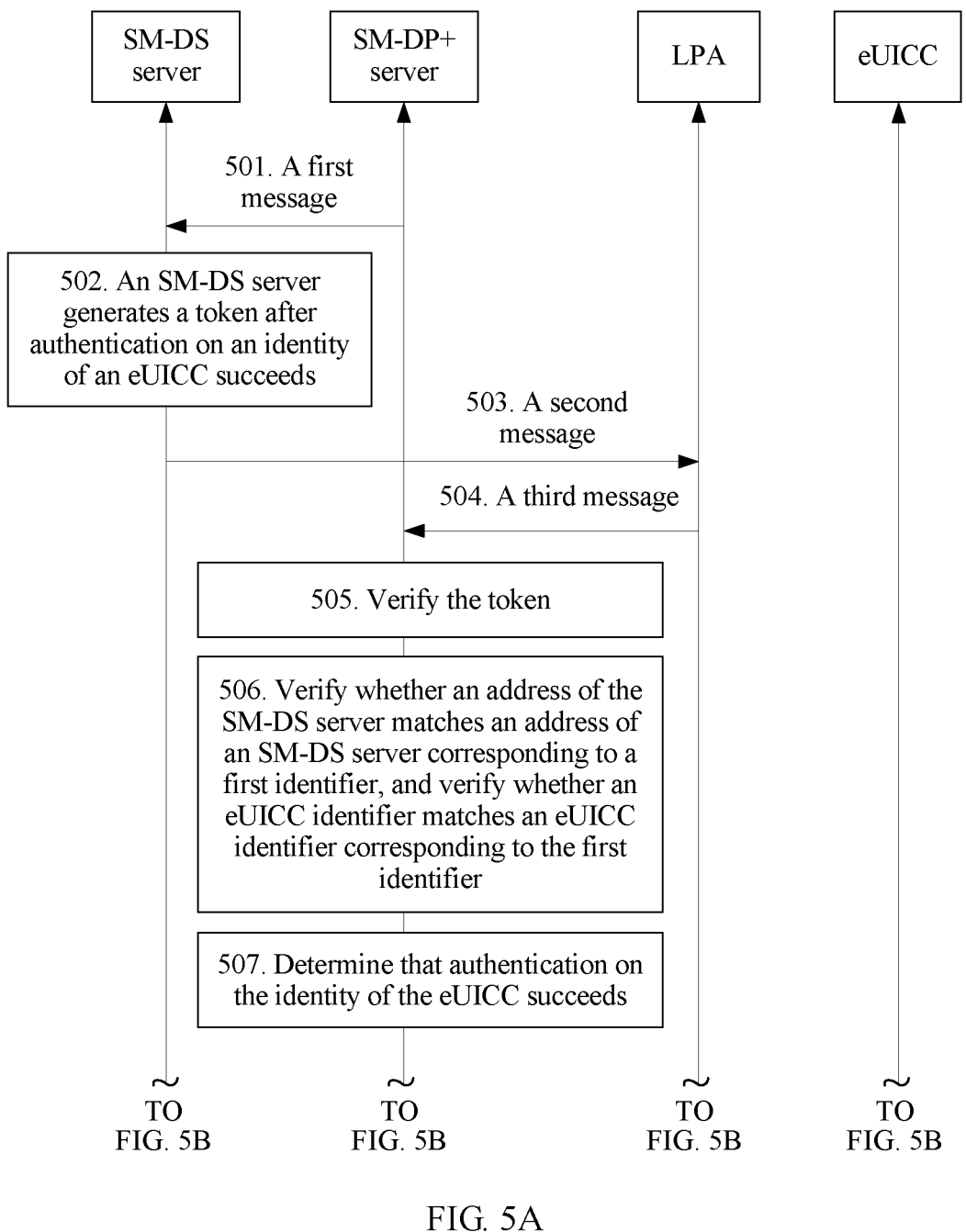
FIG. 5A and FIG. 5B are schematic flowcharts of still another remote management method according to an embodiment of the present invention.
Figure 5B:
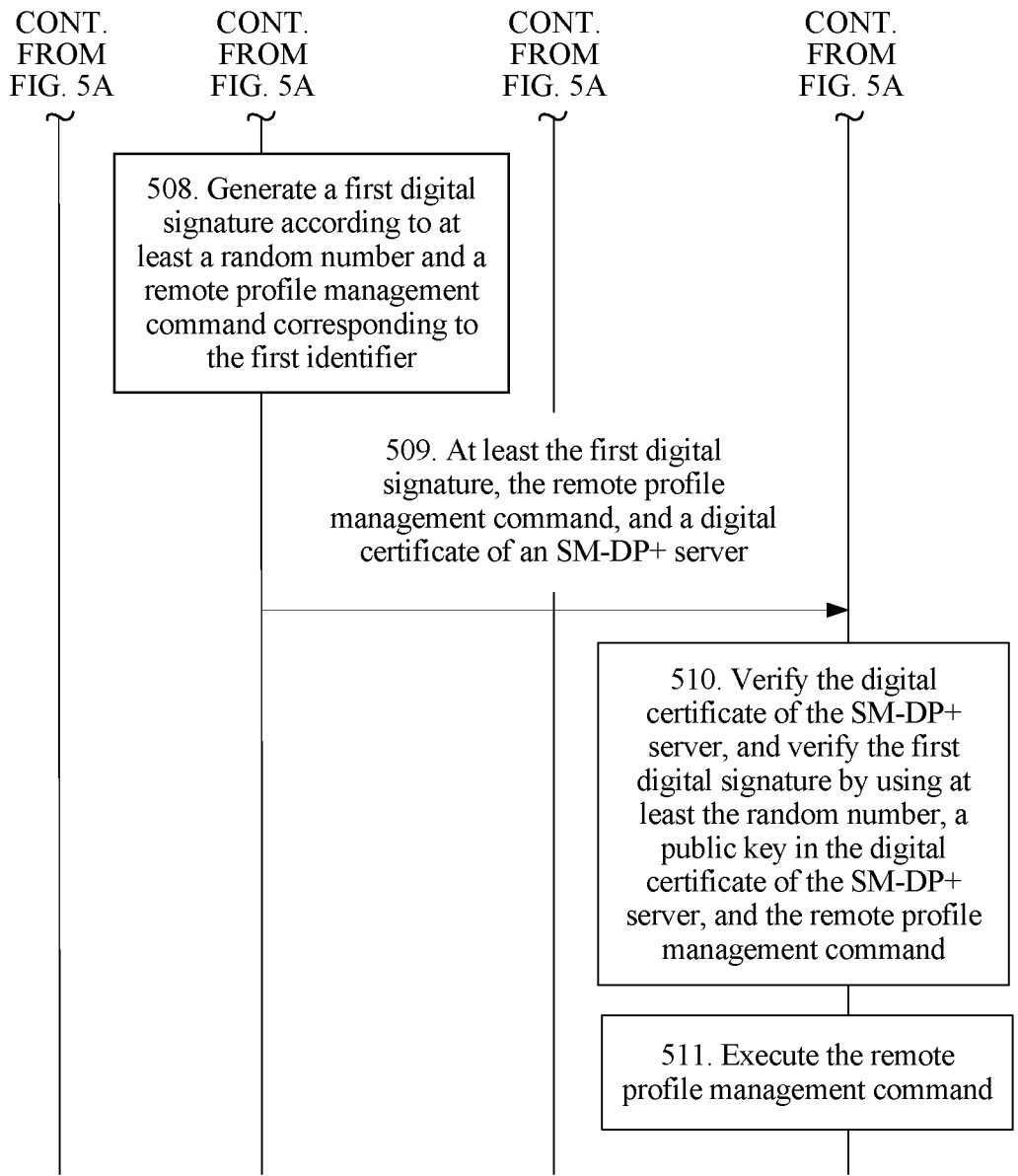

Referring to FIG. 5A and FIG. 5B, FIG. 5A and FIG. 5B are schematic flowcharts of still another remote management method according to an embodiment of the present invention. As shown in FIG. 5A and FIG. 5B, the remote management method may include steps 501 to 511.

501. An SM-DS server receives a first message sent by an SM-DP+ server.

In this embodiment of the present invention, the first message includes at least an eUICC identifier and a first identifier. Optionally, the first message may further include an address of the SM-DP+ server and eUICC information 1 (eUICCinfo1).

502. The SM-DS server generates a token after authentication performed by the SM-DS server on an identity of an eUICC succeeds.

In this embodiment of the present invention, the token is a digital signature that is generated by the SM-DS server according to at least the first identifier, the eUICC identifier, and an address of the SM-DS server.

In this embodiment of the present invention, a specific implementation in which the SM-DS server generates the digital signature according to at least the first identifier, the eUICC identifier, and the address of the SM-DS server may be as follows: The SM-DS server generates a data structure according to at least the first identifier, the eUICC identifier, and the address of the SM-DS server, and then calculates the digital signature according to the data structure by using a private key of the SM-DP+ server.

Optionally, a specific implementation in which the SM-DS server generates the token according to at least the first identifier, the eUICC identifier, and the address of the SM-DS server may be as follows: The SM-DS server performs a hash operation on the first identifier, the eUICC identifier, and the address of the SM-DS server, to obtain a message digest, and then encrypts the message digest by using a private key of the SM-DS server, to obtain the token.

503. The SM-DS server sends a second message to an LPA.

In this embodiment of the present invention, the second message includes at least the eUICC identifier, the first identifier, the token, the address of the SM-DP+ server, the address of the SM-DS server, and a digital certificate of the SM-DS server.

504. The LPA sends a third message to the SM-DP+ server.

In this embodiment of the present invention, after receiving the second message, the LPA sends the third message to the SM-DP+ server.

The third message includes at least the eUICC identifier, the first identifier, the token, the digital certificate of the SM-DS server, and the address of the SM-DS server that are in the second message.

Optionally, after receiving the second message, the LPA further triggers the eUICC to generate a random number. After generating the random number, the eUICC returns the random number to the LPA. The third message may further include the random number generated by the eUICC.

505. The SM-DP+ server verifies the token.

In this embodiment of the present invention, after receiving the third message, the SM-DP+ server verifies the token according to at least the eUICC identifier, the digital certificate of the SM-DS server, and the address of the SM-DS server.

Optionally, a specific implementation in which the SM-DP+ server verifies the token may be as follows: The SM-DP+ server verifies the digital certificate of the SM-DS server, and after the verification succeeds, obtains a public key of the SM-DS server from the digital certificate of the SM-DS server; the SM-DP+ server decrypts the token by using the public key of the SM-DS server, to obtain a message digest, and then performs a hash operation on the eUICC identifier and the address of the SM-DS server that are in the third message, to obtain a new message digest; the SM-DP+ server compares the message digest, obtained after decryption, with the new message digest; and if the message digest obtained after decryption is consistent with the new message digest, the SM-DP+ server determines that the verification on the token succeeds.

After determining that the verification on the token succeeds, the SM-DP+ server performs step 506.

506. The SM-DP+ server verifies whether an address of the SM-DS server matches an address of an SM-DS server corresponding to a first identifier, and verifies whether an eUICC identifier matches an eUICC identifier corresponding to the first identifier.

In this embodiment of the present invention, the SM-DP+ server verifies whether the address of the SM-DS server in the third message matches the address that is of the SM-DS server corresponding to the first identifier and that is sent by a communications operator, and verifies whether the eUICC identifier in the third message matches the eUICC identifier that is sent by the communications operator and that is corresponding to the first identifier.

If the address of the SM-DS server in the third message matches the address that is of the SM-DS server corresponding to the first identifier and that is sent by the communications operator, and the eUICC identifier in the third message matches the eUICC identifier that is sent by the communications operator and that is corresponding to the first identifier, the SM-DP+ server performs step 507.

507. The SM-DP+ server determines that authentication on the identity of the eUICC succeeds.

In the prior art, when the SM-DP+ server verifies the identity of the eUICC, the SM-DP+ server needs to generate a random number, and sends the random number to the eUICC by using the LPA. The eUICC generates a digital signature according to the random number, and sends, by using the LPA, a digital certificate of the eUICC and the digital signature to the SM-DP+ server for verification. If the verification performed by the SM-DP+ server on the digital signature according to a public key in the digital certificate of the eUICC succeeds, the SM-DP+ server determines that the verification on the identity of the eUICC succeeds. It can be seen that in the prior art, when the SM-DP+ server verifies the identity of the eUICC, the SM-DP+ server, the LPA, and the eUICC exchange a large amount of information, and an interaction procedure is extremely complex. After steps 501 to 507 shown in FIG. 5A are performed, the SM-DS server generates the token, and then sends the token to the SM-DP+ server by using the LPA, and the SM-DP+ server may accurately verify the identity of the eUICC according to the token. It can be seen that after steps 501 to 507 shown in FIG. 5A are performed, the interaction procedure in a process in which the SM-DP+ server verifies the identity of the eUICC is simplified, so that a whole operation procedure is more simplified.

508. The SM-DP+ server generates a first digital signature according to at least a random number and a remote profile management command corresponding to the first identifier.

In this embodiment of the present invention, when an event corresponding to the first identifier is a remote profile management event, after the SM-DP+ server determines that the authentication on the identity of the eUICC succeeds, the SM-DP+ server generates the first digital signature according to at least the random number included in the third message and the remote profile management command corresponding to the first identifier.

In this embodiment of the present invention, a specific implementation in which the SM-DP+ server generates the first digital signature according to at least the random number included in the third message and the remote profile management command corresponding to the first identifier may be as follows: The SM-DP+ server generates a data structure according to at least the random number included in the third message and the remote profile management command corresponding to the first identifier, and then calculates the first digital signature according to the data structure by using a private key of the SM-DP+ server.

Optionally, a specific implementation in which the SM-DP+ server generates the first digital signature according to at least the random number included in the third message and the remote profile management command corresponding to the first identifier may be as follows: The SM-DP+ server performs a hash operation on at least the random number included in the third message and the remote profile management command corresponding to the first identifier, to obtain a message digest, and then encrypts the message digest by using a private key of the SM-DP+ server, to obtain the first digital signature.

509. The SM-DP+ server sends at least the first digital signature, the remote profile management command, and a digital certificate of the SM-DP+ server to the eUICC by using the LPA.

510. The eUICC verifies the digital certificate of the SM-DP+ server, and verifies the first digital signature by using at least the random number, a public key in the digital certificate of the SM-DP+ server, and the remote profile management command.

In this embodiment of the present invention, after the verification on the digital certificate of the SM-DP+ server succeeds, the eUICC extracts the public key in the digital certificate of the SM-DP+ server, and verifies the first digital signature by using at least the random number, the public key in the digital certificate of the SM-DP+ server, and the remote profile management command.

Optionally, a specific implementation in which the eUICC verifies the first digital signature by using at least the random number, the public key in the digital certificate of the SM-DP+ server, and the remote profile management command may be as follows: The eUICC decrypts the first digital signature by using the public key in the digital certificate of the SM-DP+ server, to obtain a message digest, and then performs a hash operation on the random number and the remote profile management command, to obtain a new message digest; the eUICC compares the message digest, obtained after decryption, with the new message digest; and if the message digest obtained after decryption is consistent with the new message digest, the eUICC determines that the verification on the first digital signature succeeds.

If determining that the verification on the first digital signature succeeds, the eUICC performs step 511.

511. The eUICC executes the remote profile management command.

After steps 508 to 511 described in FIG. 5B are performed, the SM-DP+ server generates the first digital signature according to at least the remote profile management command corresponding to the first identifier and the random number generated by the eUICC, and sends at least the first digital signature, the remote profile management command, and the digital certificate of the SM-DP+ server to the eUICC by using the LPA. The eUICC verifies the first digital signature, and after the verification succeeds, the eUICC determines that verification on an identity of the SM-DP+ server succeeds. In addition, because the first digital signature is generated according to at least the remote profile management command, when the verification on the first digital signature succeeds, the eUICC may further determine that the remote profile management command is not tampered with by an unauthorized device. Therefore, the first digital signature is generated according to at least the remote profile management command and the random number generated by the eUICC, and provided that the verification on the first digital signature succeeds, the eUICC can determine that the verification on the identity of the SM-DP+ server succeeds and that the remote profile management command is not tampered with by the unauthorized device, so that an operation procedure is simplified. In addition, the eUICC executes the remote profile management command only after determining that the remote profile management command is not tampered with by the unauthorized device, so that security of remote profile management is improved.

In an optional implementation, after the verification performed by the eUICC on the digital certificate and the digital signature succeeds, and before the eUICC executes the remote profile management command, the eUICC may further perform the following steps:

(11) If the remote profile management command is a target command, the eUICC sends a fourth message to the LPA, where the fourth message is used to request for user confirmation.

(12) After receiving an execution confirmation message returned by the LPA, the eUICC executes the remote profile management command.

In this implementation, after receiving the fourth message, the LPA may present the user confirmation by using an LUI module. Optionally, the target command may be a profile activation command, a profile deactivation command, or a profile deletion command.

After this implementation is executed, when a profile needs to be activated, deactivated, or deleted, confirmation is requested from a user, so that security of profile information in the eUICC can be effectively improved, and the user can know an operation that is performed on the profile by a remote device.

In an optional implementation, after the eUICC executes the remote profile management command, the eUICC may further perform the following steps:

(23) The eUICC generates a remote profile management result of the remote profile management command, where the remote profile management result includes at least result code and a digital signature generated according to at least the result code.

(24) The eUICC sends, to the LPA, the remote profile management result that includes at least the result code and the digital signature generated according to at least the result code.

Correspondingly, after receiving the remote profile management result that is sent by the eUICC and that includes at least the result code and the digital signature generated according to at least the result code, the LPA sends, to the SM-DP+ server, a fifth message that includes at least the result code and the digital signature generated according to at least the result code.

Correspondingly, after the SM-DP+ server receives the fifth message, the SM-DP+ server may further perform the following steps:

(25) The SM-DP+ server sends a sixth message to the SM-DS server.

(26) The SM-DS server deletes at least the address of the SM-DP+, the eUICC identifier, and the first identifier that are sent by the SM-DP.

After the eUICC executes the remote profile management command, this implementation is executed, and the SM-DS server can delete, in a timely manner, the address of the SM-DP+, the eUICC identifier, and the first identifier that are stored in the SM-DS server, so that storage space of the SM-DS server can be saved.

The foregoing mainly describes the solutions provided in the embodiments of the present invention from a perspective of interaction between network elements. It can be understood that, to implement the foregoing functions, each network element such as the SM-DP+ server, the SM-DS server, the LPA, or the eUICC includes a corresponding hardware structure and/or software module for performing each function. A person skilled in the art may be easily aware that units and algorithm steps in the examples described with reference to the embodiments disclosed in this specification may be implemented in a form of hardware or a combination of hardware and computer software in the present invention. Whether a function is implemented by hardware or by computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, the SM-DP+ server, the SM-DS server, the eUICC, and the like may be divided into function units according to the foregoing method examples. For example, each function unit may be obtained through division according to a corresponding function, or two or more functions may be integrated into one processing unit. The integrated unit may be implemented in a form of hardware, or may be implemented in a form of a software function unit. It should be noted that the unit division in the embodiments of the present invention is an example, and is only logical function division. There may be another division manner in an actual implementation.

Figure 6A:
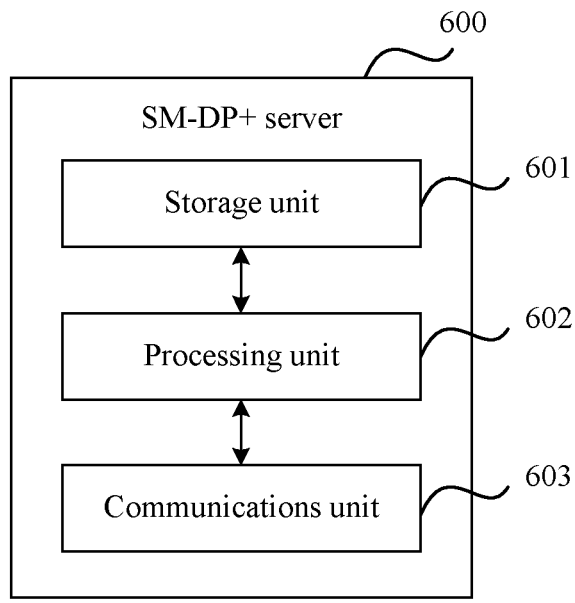
FIG. 6A is a schematic structural diagram of an SM-DP+ server according to an embodiment of the present invention.

FIG. 6A shows a possible schematic structural diagram of the SM-DP+ server in the foregoing embodiments when an integrated unit is used. The SM-DP+ server 600 includes a processing unit 602 and a communications unit 603. The processing unit 602 is configured to control and manage an action of the SM-DP+ server. For example, the processing unit 602 is configured to support the SM-DP+ server in performing processes 303, 304, and 305 in FIG. 3 and processes 402 to 405, 410 to 413, and 421 in FIG. 4B and FIG. 4C, and/or is configured to perform other technical processes described in this specification. Alternatively, the processing unit 602 is configured to support the SM-DP+ server in performing processes 505 to 509 in FIG. 5A and FIG. 5B, and/or is configured to perform other technical processes described in this specification. The communications unit 603 is configured to support the SM-DP+ server in communicating with another network entity, for example, communicating with the function module or the network entity shown in FIG. 2. The SM-DP+ server may further include a storage unit 601, configured to store program code and data of the SM-DP+ server.

The processing unit 602 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic component, a transistor logic component, a hardware component, or any combination thereof. The processing unit 602 may implement or perform various example logic blocks, modules, and circuits that are described with reference to content disclosed in the present invention. Alternatively, the processor may be a combination that implements a computation function, for example, a combination of one or more microprocessors, or a combination of a DSP and a microprocessor. The communications unit 603 may be a transceiver, a transceiver circuit, a communications interface, or the like. The storage unit 601 may be a memory.

Figure 6B:
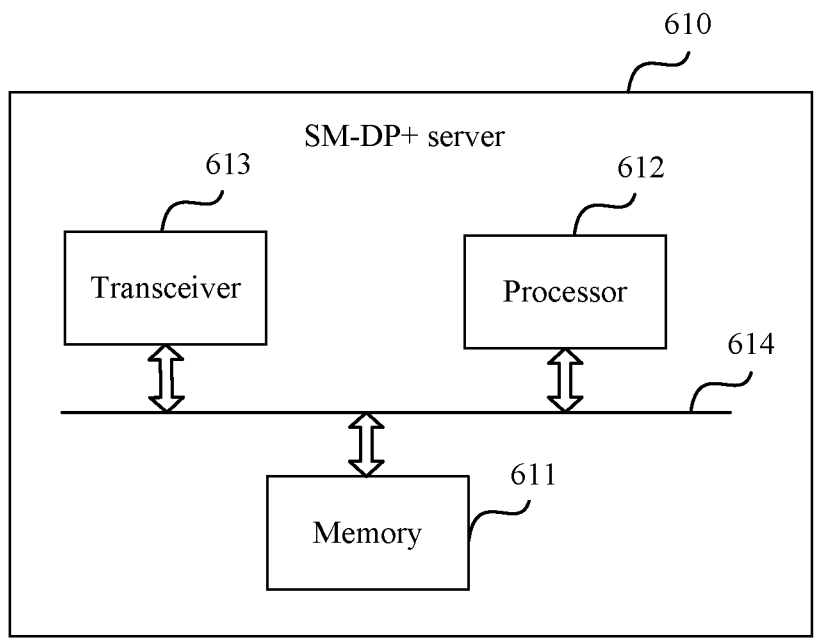
FIG. 6B is a schematic structural diagram of another SM-DP+ server according to an embodiment of the present invention.

When the processing unit 602 is a processor, the communications unit 603 is a transceiver, and the storage unit 601 is a memory, the SM-DP+ server in this embodiment of the present invention may be an SM-DP+ server shown in FIG. 6B.

Referring to FIG. 6B, the SM-DP+ server 610 includes a processor 612, a transceiver 613, a memory 611, and a bus 614. The transceiver 613, the processor 612, and the memory 611 are interconnected by using the bus 614. The bus 614 may be a peripheral component interconnect (peripheral component interconnect, PCI for short) bus, an extended industry standard architecture (extended industry standard architecture, EISA for short) bus, or the like. The bus 614 may be classified into an address bus, a data bus, a control bus, and the like. For ease of representation, only one thick line is used in FIG. 6B for representation, but it does not indicate that there is only one bus or one type of bus.

Figure 7A:
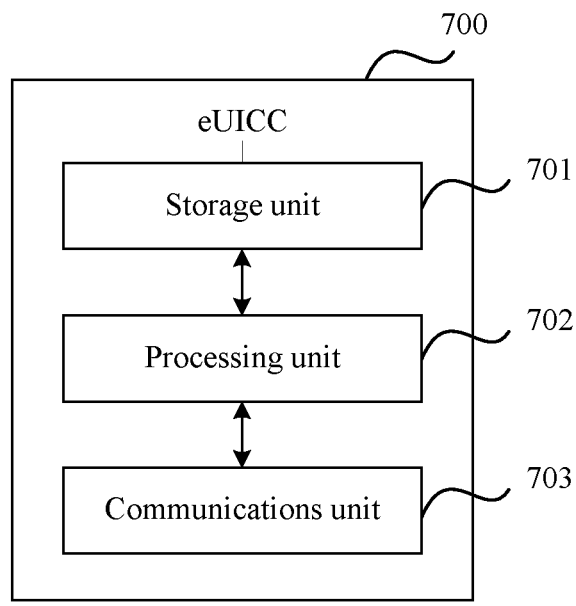
FIG. 7A is a schematic structural diagram of an eUICC according to an embodiment of the present invention.

FIG. 7A shows a possible schematic structural diagram of the eUICC in the foregoing embodiments when an integrated unit is used. The eUICC 700 includes a processing unit 702 and a communications unit 703. The processing unit 702 is configured to control and manage an action of the eUICC. For example, the processing unit 702 is configured to support the eUICC in performing processes 306 and 307 in FIG. 3 and processes 414, 415, and 417 to 419 in FIG. 4B and FIG. 4C, and/or is configured to perform other technical processes described in this specification. Alternatively, the processing unit 702 is configured to support the eUICC in performing processes 510 and 511 in FIG. 5B, and/or is configured to perform other technical processes described in this specification. The communications unit 703 is configured to support the eUICC in communicating with another network entity, for example, communicating with the function module or the network entity shown in FIG. 2. The eUICC may further include a storage unit 701, configured to store program code and data of the eUICC.

The processing unit 702 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic component, a transistor logic component, a hardware component, or any combination thereof. The processing unit 702 may implement or perform various example logic blocks, modules, and circuits that are described with reference to content disclosed in the present invention. Alternatively, the processor may be a combination that implements a computation function, for example, a combination of one or more microprocessors, or a combination of a DSP and a microprocessor. The communications unit 703 may be a transceiver, a transceiver circuit, a communications interface, or the like. The storage unit 701 may be a memory.

Figure 7B:
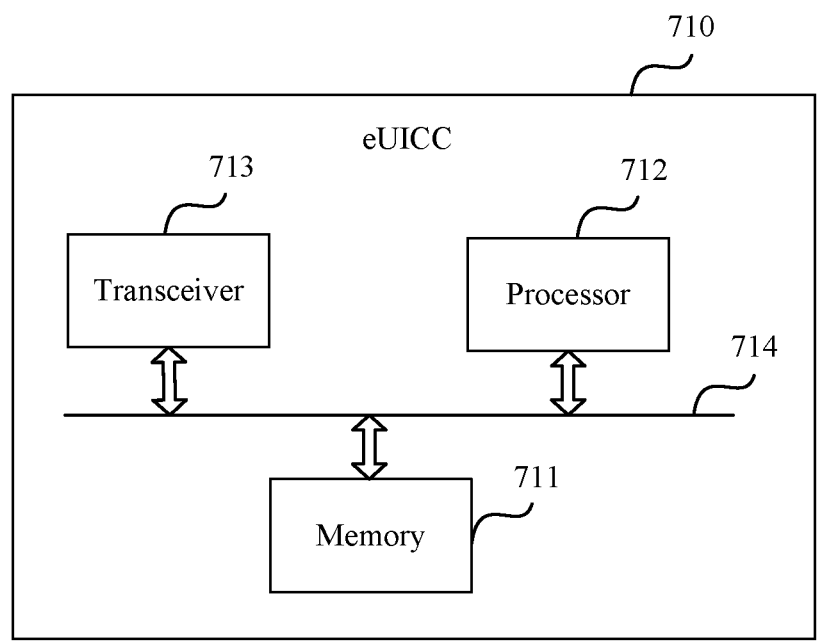
FIG. 7B is a schematic structural diagram of another eUICC according to an embodiment of the present invention.

When the processing unit 702 is a processor, the communications unit 703 is a transceiver, and the storage unit 701 is a memory, the eUICC in this embodiment of the present invention may be an eUICC shown in FIG. 7B.

Referring to FIG. 7B, the eUICC 710 includes a processor 712, a transceiver 713, a memory 711, and a bus 714. The transceiver 713, the processor 712, and the memory 711 are interconnected by using the bus 714. The bus 714 may be a peripheral component interconnect (peripheral component interconnect, PCI for short) bus, an extended industry standard architecture (extended industry standard architecture, EISA for short) bus, or the like. The bus 714 may be classified into an address bus, a data bus, a control bus, and the like. For ease of representation, only one thick line is used in FIG. 7B for representation, but it does not indicate that there is only one bus or one type of bus.

Figure 8A:
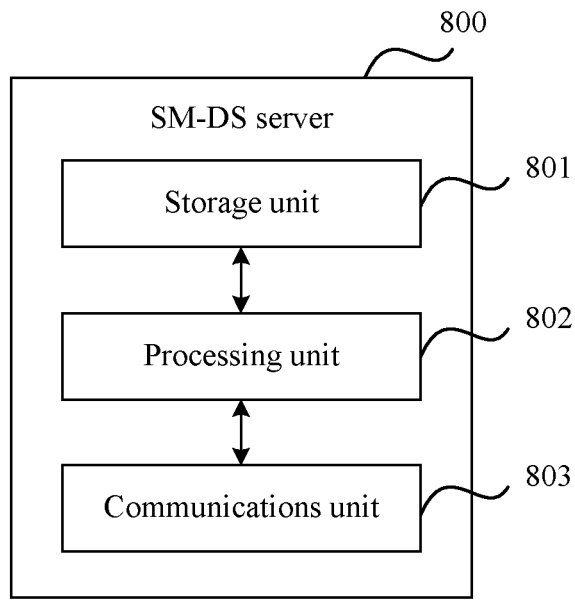
FIG. 8A is a schematic structural diagram of an SM-DS server according to an embodiment of the present invention.

FIG. 8A shows a possible schematic structural diagram of the SM-DS server in the foregoing embodiments when an integrated unit is used. The SM-DS server 800 includes a processing unit 802 and a communications unit 803. The processing unit 802 is configured to control and manage an action of the SM-DS server. For example, the processing unit 802 is configured to support the SM-DS server in performing processes 501 to 503 in FIG. 5A, and/or is configured to perform another process of the technology described in this specification. The communications unit 803 is configured to support the SM-DS server in communicating with another network entity, for example, communicating with the function module or the network entity shown in FIG. 2. The SM-DS server may further include a storage unit 801, configured to store program code and data of the SM-DS server.

The processing unit 802 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic component, a transistor logic component, a hardware component, or any combination thereof. The processing unit 802 may implement or perform various example logic blocks, modules, and circuits that are described with reference to content disclosed in the present invention. Alternatively, the processor may be a combination that implements a computation function, for example, a combination of one or more microprocessors, or a combination of a DSP and a microprocessor. The communications unit 803 may be a transceiver, a transceiver circuit, a communications interface, or the like. The storage unit 801 may be a memory.

Figure 8B:
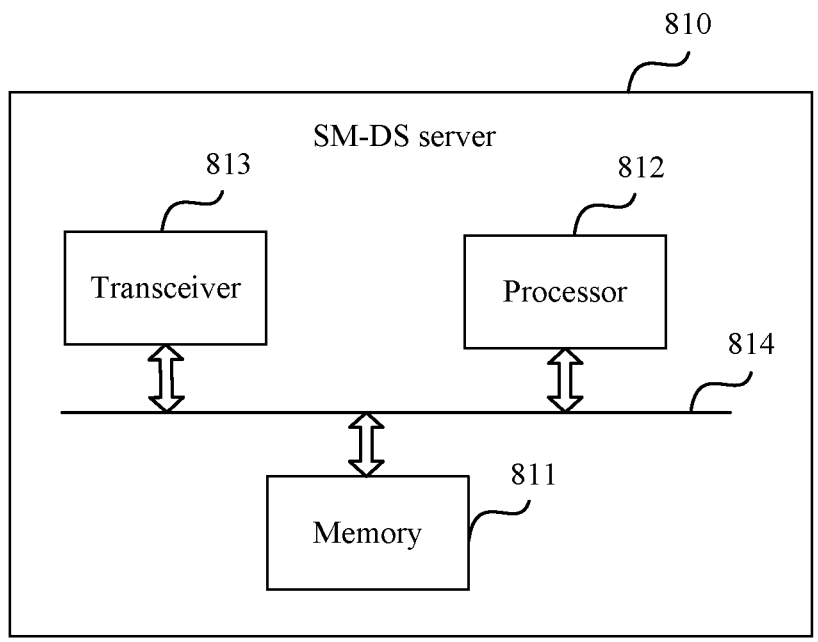
FIG. 8B is a schematic structural diagram of another SM-DS server according to an embodiment of the present invention.

When the processing unit 802 is a processor, the communications unit 803 is a transceiver, and the storage unit 801 is a memory, the SM-DS server in this embodiment of the present invention may be an SM-DS server shown in FIG. 8B.

Referring to FIG. 8B, the SM-DS server 810 includes a processor 812, a transceiver 813, a memory 811, and a bus 814. The transceiver 813, the processor 812, and the memory 811 are interconnected by using the bus 814. The bus 814 may be a peripheral component interconnect (peripheral component interconnect, PCI for short) bus, an extended industry standard architecture (extended industry standard architecture, EISA for short) bus, or the like. The bus 814 may be classified into an address bus, a data bus, a control bus, and the like. For ease of representation, only one thick line is used in FIG. 8B for representation, but it does not indicate that there is only one bus or one type of bus.

It should be noted that, in the foregoing embodiments, the description of each embodiment has respective focuses. For a part that is not described in detail in an embodiment, refer to related descriptions in other embodiments. In addition, a person skilled in the art should also appreciate that all the embodiments described in this specification are example embodiments, and the related actions and modules are not necessarily mandatory to the present invention.

A sequence of the steps of the method in the embodiments of the present invention may be adjusted, and some steps may also be combined or deleted according to an actual requirement.

The modules in the terminal in the embodiments of the present invention may be combined, divided, or deleted according to an actual requirement.

The modules in the embodiments of the present invention may be implemented by a universal integrated circuit such as a CPU (Central Processing Unit, central processing unit), or an ASIC (Application Specific Integrated Circuit, application-specific integrated circuit).

A person of ordinary skill in the art may understand that all or some processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disc, a read-only memory (Read-Only Memory, ROM), a random access memory (Random Access Memory, RAM), or the like.

In conclusion, the foregoing descriptions are only examples embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A remote management method, comprising:
receiving, by a subscription manager-data preparation (SM-DP+) server, a first identifier from a local profile assistant (LPA) in a user terminal;
searching for, by the SM-DP+ server, a remote profile management command corresponding to the first identifier;
generating, by the SM-DP+ server, a first digital signature according to the first identifier and the remote profile management command;
sending, by the SM-DP+ server, the first digital signature and the remote profile management command to an embedded universal integrated circuit card (eUICC) using the LPA;
receiving, by the SM-DP+ server a message from the LPA, wherein the message comprises the first identifier, a token, a digital certificate of a subscription manager-discovery service (SM-DS) server, and an address of the SM-DS server, and wherein the token is a digital signature generated by the SM-DS server according to at least the first identifier, an eUICC identifier, and the address of the SM-DS server;
verifying, by the SM-DP+ server, the token; and
responsive to successfully verifying the token, verifying, by the SM-DP+ server, (i) whether the address of the SM-DS server matches a first address of a first SM-DS server corresponding to the first identifier, and (ii) whether the eUICC identifier matches a first eUICC identifier corresponding to the first identifier.

2. The method of claim 1, wherein after receiving the first identifier from the LPA, the method further comprises:

checking, by the SM-DP+ server, whether the SM-DP+ server stores an event corresponding to the first identifier; and replacing, by the SM-DP+ server, an interaction identifier with the first identifier when the SM-DP+ server stores the event and the event comprises a remote profile management event, wherein searching for the remote profile management command comprises searching for, by the SM-DP+ server, the remote profile management command when the event comprises the remote profile management event.

3. The method of claim 1, further comprising:

receiving, by the SM-DP+ server, a second digital signature, a first digital certificate of the eUICC, and a second digital certificate of an eUICC manufacturer (EUM) from the eUICC using the LPA, the second digital signature being generated by the eUICC according to the first identifier;

verifying, by the SM-DP+ server, the second digital certificate and the first digital certificate;

verifying, by the SM-DP+ server, the second digital signature using the first identifier and a public key in the first digital certificate of the eUICC; and searching for, by the SM-DP+ server, the remote profile management command corresponding to the first identifier when verification on the first digital certificate, the second digital certificate, and the second digital signature all succeed.

4. The method of claim 1, wherein after sending the first digital signature and the remote profile management command to the eUICC using the LPA, the method further comprises:

receiving, by the SM-DP+ server, a first message from the LPA, wherein the first message comprises the first identifier and a second digital signature generated by the eUICC according to the first identifier; and sending, by the SM-DP+ server, a second message to SM-DS server, wherein the second message comprises the address of the SM-DP+ server, the eUICC identifier, and the first identifier, wherein the second message is to be used by the SM-DS server to delete the address of the SM-DP+, the eUICC identifier, and the first identifier after the eUICC executes the remote profile management command.

5. The method of claim 1, further comprising:

performing, by the SM-DP+ server, a hash operation on the first identifier and the remote profile management command to obtain a message digest; and generating, by the SM-DP+ server, a first digital signature by encrypting the message digest, wherein the SM-DP+ server generates the first digital signature according to the first identifier and the remote profile management command, wherein the SM-DP+ server encrypts the message digest using a private key of the SM-DP+ server.

6. The method of claim 5, further comprising the eUICC decrypting the first digital signature to obtain a previous message digest.

7. The method of claim 6, wherein the eUICC decrypts the first digital signature using a public key in a previously received digital certificate of the SM-DP+ server.

8. The method of claim 1, further comprising:

receiving, by the SM-DP+ server, a first message from the LPA, wherein the first message comprises the first identifier and a second digital signature generated by the eUICC according to the first identifier, and wherein the first message notifies the SM-DP+ server of a remote profile management result of the remote profile management command executed by the eUICC; and sending, by the SM-DP+ server, a second message to a subscription manager-discovery service (SM-DS) server in response to being notified of the remote profile management result, wherein the second message comprises an address of the SM-DP+ server, an eUICC identifier, and the first identifier, and wherein the second message instructs the SM-DS server to delete the address of the SM-DP+, the eUICC identifier, and the first identifier such that the remote profile management command can no longer be executed.

9. The method of claim 1, further comprising determining, by the SM-DP+ server, that authentication on an identity of the eUICC succeeds when the address of the SM-DS server matches the first address and the eUICC identifier matches the first eUICC identifier.

10. A remote management method, comprising:

receiving, by an embedded universal integrated circuit card (eUICC), a first identifier from a local profile assistant (LPA);

receiving, by the eUICC, a message from the LPA, wherein the message includes at least a first digital signature, a remote profile management command, and a digital certificate of a subscription manager-data preparation (SM-DP+) server, wherein the first digital signature is generated by the SM-DP+ server according to at least a random number and the remote profile management command, and wherein the random number is generated by the eUICC;

verifying, by the eUICC, the digital certificate of the SM-DP+ server;

verifying, by the eUICC, the first digital signature by using at least the random number, a public key in the digital certificate of the SM-DP+ server, and the remote profile management command; and executing, by the eUICC, the remote profile management command only when the eUICC successfully verifies both the digital certificate of the SM-DP+ server and the first digital signature succeeds, wherein after receiving the first identifier from the LPA, the method further comprises:

generating, by the eUICC, a second digital signature according to the first identifier; and sending, by the eUICC, the second digital signature, a digital certificate of the eUICC, and a second digital certificate of an eUICC manufacturer (EUM) to the SM-DP+ server using the LPA.

11. The method of claim 10, wherein after verification performed by the eUICC on the first digital signature succeeds and before the eUICC executes the remote profile management command, the method further comprises:

sending, by the eUICC, a first message requesting for a user confirmation to the LPA when the remote profile management command comprises a target command; and executing, by the eUICC, the remote profile management command after receiving an execution confirmation message from the LPA.

12. The method of claim 10, wherein after executing the remote profile management command, the method further comprises:

generating, by the eUICC, a remote profile management result of the remote profile management command executed by the eUICC, wherein the remote profile management result comprises the first identifier and a third digital signature generated according to the first identifier; and sending, by the eUICC, the remote profile management result comprising the first identifier and the third digital signature to the SM-DP+ server via the LPA.

13. The method of claim 12, wherein the eUICC sends the remote profile management result such that the SM-DP+ server promptly instructs a subscription manager-discovery service (SM-DS) server to delete an address of the SM-DP+ server, an eUICC identifier, and the first identifier, and wherein the remote profile management command cannot be executed after the SM-DS server deletes the address of the SM-DP+ server, the eUICC identifier, and the first identifier.

14. The method of claim 10, wherein the method is implemented by a user terminal comprising the eUICC and the LPA.

15. A user terminal comprising a local profile assistant (LPA) and an embedded universal integrated circuit card (eUICC), and the eUICC comprising:
    a transceiver; and
    a processor coupled to the transceiver and configured to:
        receive, using the transceiver, a first identifier from the LPA;
        receive, using the transceiver, a message from the LPA, wherein the message includes at least a first digital signature, a remote profile management command, and a digital certificate of a subscription manager-data preparation (SM-DP+) server, wherein the first digital signature is generated by the SM-DP+ server according to at least a random number and the remote profile management command, and wherein the random number is generated by the eUICC;
        verify the digital certificate of the SM-DP+ server;
        verify the first digital signature by using at least the random number, a public key in the digital certificate of the SM-DP+ server, and the remote profile management command; and
        execute the remote profile management command only when the eUICC successfully verifies both the digital certificate of the SM-DP+ server and the first digital signature.

16. The user terminal of claim 15, wherein the processor is further configured to:
    generate a second digital signature according to the first identifier after receiving the first identifier from the LPA; and
    send the second digital signature, a digital certificate of the eUICC, and a second digital certificate of an eUICC manufacturer (EUM) to the SM-DP+ server using the transceiver and the LPA.

17. The user terminal of claim 15, wherein the processor is further configured to:
    send, using the transceiver, a first message to the LPA after verification of the first digital signature succeeds and when the remote profile management command comprises a target command, the first message requesting for a user confirmation; and
    execute the remote profile management command after receiving an execution confirmation message from the LPA.

18. The user terminal of claim 15, wherein the processor is further configured to:
    generate a remote profile management result of the remote profile management command, the remote profile management result comprising the first identifier and a third digital signature generated according to the first identifier; and
    send, to the LPA using the transceiver, the remote profile management result comprising the first identifier and the third digital signature.

19. The user terminal of claim 15, wherein the processor is further configured to:
    perform a hash operation on the first identifier and the remote profile management command to obtain a message digest;
    verify the first digital signature by comparing the message digest with a previous message digest; and
    decrypt the first digital signature to obtain the previous message digest.

20. The user terminal of claim 19, wherein the processor is further configured to:
    obtain the previous message digest by decrypting the first digital signature using a public key of the SM-DP+ server; and
    generate a second digital signature by encrypting the previous message digest using a private key of the eUICC.

21. The user terminal of claim 15, wherein the processor is further configured to:
    generate a remote profile management result of the remote profile management command executed by the eUICC; and
    send the remote profile management result to the SM-DP+ server via the LPA, wherein the eUICC sends the remote profile management result such that the SM-DP+ server promptly instructs a subscription manager-discovery service (SM-DS) server to delete an address of the SM-DP+ server, an eUICC identifier, and the first identifier, and wherein the remote profile management command cannot be executed after the SM-DS server deletes the address of the SM-DP+, the eUICC identifier, and the first identifier.

* * * * *